United States Patent
Ren et al.

(10) Patent No.: US 11,403,420 B2
(45) Date of Patent: Aug. 2, 2022

(54) SYSTEM, METHOD, AND COMPUTER PROGRAM PRODUCT FOR MAINTAINING USER PRIVACY IN ADVERTISEMENT NETWORKS

(71) Applicant: Visa International Service Association, San Francisco, CA (US)

(72) Inventors: Jingjing Ren, Boston, MA (US); Abhinav Aggarwal, Albuquerque, NM (US); Mastooreh Salajegheh, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 384 days.

(21) Appl. No.: 16/558,910

(22) Filed: Sep. 3, 2019

(65) Prior Publication Data

US 2020/0074112 A1      Mar. 5, 2020

Related U.S. Application Data

(60) Provisional application No. 62/725,520, filed on Aug. 31, 2018.

(51) Int. Cl.
*G06F 21/62*      (2013.01)
*G06F 16/901*      (2019.01)
(Continued)

(52) U.S. Cl.
CPC ...... *G06F 21/6245* (2013.01); *G06F 16/9027* (2019.01); *G06Q 30/0255* (2013.01); *H04L 9/006* (2013.01)

(58) Field of Classification Search
CPC ............. G06F 21/6245; G06F 16/9027; G06F 21/6254; G06F 16/2246; G06Q 30/0255;
(Continued)

(56) References Cited

U.S. PATENT DOCUMENTS

| 2003/0235307 A1* | 12/2003 | Miyamoto | H04L 9/14 380/269 |
| 2013/0013508 A1* | 1/2013 | Carlson | G06Q 40/02 705/44 |

(Continued)

OTHER PUBLICATIONS

Abdalla et al., "Simple Functional Encryption Schemes for Inner Products", IACR International Workshop on Public Key Cryptography, 2015, pp. 733-751.

(Continued)

*Primary Examiner* — Meng Li
(74) *Attorney, Agent, or Firm* — The Webb Law Firm

(57) ABSTRACT

A method for maintaining user privacy in advertisement networks may include receiving first persona data associated with a first user from at least one publisher system. The first persona data may be generalized to form first generalized persona data. A session key may be generated. The first generalized persona data and the session key may be encrypted with a first public key of an advertisement network system to form a first ciphertext. The first ciphertext and first user identity data may be communicated to a mediator system. The first user identity data may be associated with the first user's identity. A first encrypted targeted advertisement may be received based on the first generalized persona data from the advertisement network system via the mediator system. The first encrypted targeted advertisement may be decrypted with the session key to form a first targeted advertisement. A system and computer program product are also disclosed.

17 Claims, 8 Drawing Sheets

(51) Int. Cl.
H04L 9/00 (2022.01)
G06Q 30/02 (2012.01)

(58) Field of Classification Search
CPC . H04L 9/006; H04L 9/0825; H04L 2209/805; H04L 9/008; H04L 2209/42
See application file for complete search history.

(56) References Cited

U.S. PATENT DOCUMENTS

| | | | | |
|---|---|---|---|---|
| 2013/0124866 A1* | 5/2013 | Farrugia | ............... | H04L 9/0825 713/171 |
| 2013/0191629 A1* | 7/2013 | Treinen | .................... | H04L 9/08 713/153 |
| 2015/0149765 A1* | 5/2015 | Pauliac | ............... | H04W 12/033 713/153 |

OTHER PUBLICATIONS

Aggarwal et al., "A General Survey of Privacy-Preserving Data Mining Models and Algorithms", Privacy-Preserving Data Mining, 2008, pp. 11-52.
Akkus et al., "Non-tracking Web Analytics", Proceedings of the 2012 ACM Conference on Computer and Communications Security, 2012, pp. 687-698.
Aksu et al., "Advertising in the IoT Era: Vision and Challenges", IEEE Communications Magazine, 2018, pp. 138-144, vol. 56, No. 11.
Bashir et al., "Tracing Information Flows Between Ad Exchanges Using Retargeted Ads", Proceedings of the 25th USENIX Security Symposium, 2016, pp. 481-496.
Brickell et al., "Efficient Anonymity-Preserving Data Collection", Proceedings of the 12th ACM SIGKDD International Conference on Knowledge Discovery and Data Mining, 2006, pp. 76-85.
Daswani et al., "Online Advertising Fraud", Crimewire, 2008, 28 pages, Symantec Press.
Elgamal, "A Public Key Cryptosystem and a Signature Scheme Based on Discrete Logarithms", IEEE Transactions an Information Theory, 1985, pp. 469-472, vol. 31, No. 4.
Fredrikson et al., "RePriv: Re-Imagining Content Personalization and In-Browser Privacy", 2011 IEEE Symposium on Security and Privacy, 2011, pp. 131-146.
Groopman et al., "Consumer Perceptions of Privacy in the Internet of Things", Altimeter Group, 2015, retrieved from https//img04.en25.com/Web/ProphetBrandStrategy/%7BfOd0811e-edc9-4b85-8897-9f68db5096af%7D_Consumer-Perceptions-Privacy-IoT-Altimeter.pdf, 25 pages.
Hannak et al., "Measuring Personalization of Web Search", Proceedings of the 22nd International Conference on World Wide Web, 2013, pp. 527-538.
Hannak et al., "Measuring Price Discrimination and Steering on E-commerce Web Sites", Proceedings of the 2014 Internet Measurement Conference, 2014, pp. 305-318.
Leung et al., "Should You Use the App for That? Comparing the Privacy Implications of App- and Web-based Online Services", Proceedings of the 2016 Internet Measurement Conference, 2016, pp. 365-372.
Li et al., "t-Closeness: Privacy Beyond k-Anonymity and I-Diversity", 2007 IEEE 23rd International Conference on Data Engineering, 2007, pp. 106-115.
Liu et al., "Identifying Personal Information in Internet Traffic", Proceedings of the 2015 ACM Conference on Online Social Networks, 2015, pp. 59-70.
Paillier, "Public-Key Cryptosystems Based on Composite Degree Residuosity Classes", International Conference or the Theory and Applications of Cryptographic Techniques EUROCRYPT 1999: Advances in Cryptology—EUROCRYPT '99, pp. 223-238.
Pandey et al., "Learning to Target: What Works for Behavioral Targeting", Proceedings of the 20th ACM International Conference on Information and Knowledge Management, 2011, pp. 1805-1814.
Perlich et al., "Machine learning for targeted display advertising: transfer learning in action", Machine Learning, 2014, pp. 103-127, vol. 95, No. 1.
Petrovic, "The Internet of Things as Disruptive Innovation for the Advertising Ecosystem", Commercial Communication in the Digital Age, 2017, pp. 183-205, De Gruyter Saur, Berlin, Germany.
Ren et al., "ReCon: Revealing and Controlling PII Leaks in Mobile Network Traffic", arXiv, 2016, 18 pages, retrieved at arXiv:1507.00255.
Ren et al., "Bug Fixes, Improvements, . . . and Privacy Leaks A Longitudinal Study of PII Leaks Across Android App Versions", Proceedings of the Network and Distributed System Security (NDSS) Symposium, 2018, 15 pages.
Samarati et al., "Protecting Privacy when Disclosing Information: k-Anonymity and Its Enforcement through Generalization and Suppression", Technical Report SRI-CSL-98-04, 1998, 19 pages, SRI International.
Toubiana et al., "Adnostic: Privacy Preserving Targeted Advertising", Proceedings of the Network and Distributed System Security Symposium, 2010, 23 pages.
Wolinsky et al., "Dissent in Numbers: Making Strong Anonymity Scale", Proceedings of the 10th USENIX Symposium on Operating Systems Design and Implementation (OSDI '12), 2012, pp. 179-182.
Wu et al., "An Accountable Anonymous Data Aggregation Scheme for Internet of Things", arXiv, 2018, 10 pages, retrieved at arXiv:1803.07760.
"About Audience Targeting", Google Ads Help, retrieved from https://support.google.com/adwords/answer/2497941?hl=en, accessed on Jul. 19, 2018.
"Ad Integration API", AOL, retrieved from https://learn.onemobile.aol.com/hc/en-us/articles/205081000-Ad-Integration-API#ur-call, accessed on Jul. 19, 2018.
"Audiences", AOL Advertising, retrieved from https://advertising.aol.com/audiences, accessed on Jul. 19, 2018.
"Gartner Says 8.4 Billion Connected "Things" Will Be in Use in 2017, Up 31 Percent From 2016", Gartner, Inc., 2017, retrieved from https://www.gartner.com/newsroom/id/3598917, accessed May 18, 2018.
"How to Target Audiences with Facebook Ads", Facebook Business, retrieved at https://www.facebook.com/business/learn/facebook-ads-choose-audience, accessed on Jul. 19, 2018.
"Surf the Web with No Annoying Ads", Adblock Plus, retrieved from https://adblockplus.org/, accessed on Aug. 20, 2018.
"UTD Paillier Threshold Encryption Toolbox", retrieved from http://www.cs.utdallas.edu/dspl/cgi-bin/pailliertoolbox/, accessed on Aug. 19, 2018.

* cited by examiner

SYSTEM, METHOD, AND COMPUTER PROGRAM PRODUCT FOR MAINTAINING USER PRIVACY IN ADVERTISEMENT NETWORKS

CROSS REFERENCE TO RELATED APPLICATIONS

The present application claims the benefit of U.S. Provisional Patent Application No. 62/725,520 filed Aug. 31, 2018, the disclosure of which is hereby incorporated by reference in its entirety.

BACKGROUND

1. Field

This disclosed subject matter relates generally to methods, systems, and products for privacy in networks and, in some particular embodiments, to a system, method, and computer program product for maintaining user privacy in advertisement networks.

2. Technical Considerations

Certain advertising techniques (e.g., online advertising techniques and/or the like) rely on tracking user activities and personal data in order to personalize advertisements. For example, users may have two types of information: identifiable and non-identifiable. Identifiable information may be linked to an individual. Such identifiable information may be protected by privacy laws. If not handled properly, identifiable data may cause harm to the individual. As such, sharing of identifiable data with unauthorized parties should be prevented.

Additionally, the Internet of Things (IoT) is proliferating, and IoT devices are projected to reach tens of billions in the coming years. IoT devices may be equipped with various sensors for context awareness and with ubiquitous Internet connectivity, providing a continuous stream of events and actions to users. Data based on such streams may provide an opportunity for personalized advertising.

However, certain techniques for providing personalized advertisements to users risk exposing identifiable information to external systems or entities. For example, an advertisement network may track online activities of users and therefore preserve the linkage between user identity data and other user data. Users have limited options to audit and control the data flow, with blocking (the most common option) being an all-or-nothing proposition. Further, in the IoT context, there is a lack of a native global view of information being shared. For example, IoT devices do not necessarily talk to all other devices or a central point. In addition, regulations/restrictions on data access, lack of user consent, and user resistance (e.g., for privacy concerns) may result in unavailability of access to user information. For example, extending existing tracking mechanisms to IoT may result in a significant backlash from consumers and regulators. In light of frequent data breaches, consumer resistance, and strict privacy regulations, among other challenges, balancing privacy with the need to access user information may be difficult.

SUMMARY

Accordingly, it is an object of the presently disclosed subject matter to provide systems, methods, and computer program products for maintaining user privacy in advertisement networks.

According to non-limiting embodiments, provided is a computer-implemented method for maintaining user privacy in advertisement networks. In some non-limiting embodiments, a computer-implemented method for maintaining user privacy in advertisement networks may include receiving, with a first user device, first persona data associated with a first user from at least one publisher system. The first user device may generalize the first persona data to form first generalized persona data. The first user device may generate a session key. The first user device may encrypt the first generalized persona data and the session key with a first public key of an advertisement network system to form a first ciphertext. The first user device may communicate the first ciphertext and first user identity data to a mediator system. The first user identity data may be associated with an identity of the first user. The first user device may receive a first encrypted targeted advertisement based on the first generalized persona data from the advertisement network system via the mediator system. The first user device may decrypt the first encrypted targeted advertisement with the session key to form a first targeted advertisement.

In some non-limiting embodiments, the first persona data may include a first vector. Additionally or alternatively, a plurality of users may include the first user. Additionally or alternatively, each respective user of the plurality of users may be associated with respective persona data, which may include a respective vector. Additionally or alternatively, each respective vector may include a plurality of respective attributes. In some non-limiting embodiments, generalizing the first persona data may include, for each respective attribute of the plurality of respective attributes, generating a tree with a plurality of leaf nodes and a plurality of non-leaf nodes. Additionally or alternatively, each leaf node may be associated with at least one possible value of the respective attribute. Additionally or alternatively, each non-leaf node may be associated with a hierarchical category associated with at least two leaf nodes. In some non-limiting embodiments, a number of users of the plurality of users having a respective attribute value for the respective attribute associated with the at least one possible value of each leaf node may be counted. Additionally or alternatively, for each respective non-leaf node, a sum of the number of users for all leaf nodes under the respective non-leaf node may be determined. In some non-limiting embodiments, for each respective attribute of the first vector, whether the number of users of the plurality of users having the respective attribute value for the respective attribute associated with the at least one possible value of a respective leaf node exceeds a threshold may be determined. Additionally or alternatively, if the number of users exceeds the threshold, the respective attribute value for the respective attribute may be retained. Additionally or alternatively, if the number of users does not exceed the threshold, the respective attribute value for the respective attribute may be replaced with the hierarchical category associated with a first non-leaf node for which the sum exceeds the threshold above the respective leaf node.

In some non-limiting embodiments, a plurality of user devices may include a respective user device for each respective user of the plurality of users. In some non-limiting embodiments, counting the number of users may include, for each respective attribute of the plurality of respective attributes, encrypting, with each respective user device, the respective attribute value of the respective attribute with a second public key to form an encrypted respective attribute value. Additionally or alternatively, each respective user device may include a respective share of a private key associated with the second public key. In some non-limiting embodiments, each respective user device may transmit a message, which may include the encrypted respective attribute value, to the mediator system. Additionally or alternatively, the mediator system may combine the messages from each respective user device with additive homomorphic encryption to form a combined message. Additionally or alternatively, the mediator system may transmit the combined message to each respective user device. Additionally or alternatively, each respective user device may decrypt a share of the combined message using the respective share of the private key of the respective user device. Additionally or alternatively, each respective user device may transmit the share of the combined message to the mediator system. Additionally or alternatively, the mediator system may combine the shares of the combined message from each respective user device to form a sum of the messages. In some non-limiting embodiments, the number of users may be based on the sum of the messages.

In some non-limiting embodiments, the mediator system may generate first pseudo-identity data associated with the first user identity data. Additionally or alternatively, the mediator system may communicate the first ciphertext and the first pseudo-identity data to the advertisement network system.

In some non-limiting embodiments, the advertisement network system may decrypt the first ciphertext with a first private key of the advertisement network to form the first generalized persona data and the session key. Additionally or alternatively, the advertisement network system may determine the first targeted advertisement based on the first generalized persona data. Additionally or alternatively, the advertisement network system may encrypt the first targeted advertisement with the session key to form the first encrypted targeted advertisement. Additionally or alternatively, the advertisement network system may communicate the first encrypted targeted advertisement and the first pseudo-identity data to the mediator system.

In some non-limiting embodiments, the mediator system may determine the first user identity data based on the first pseudo-identity data. Additionally or alternatively, the mediator system may communicate the first encrypted targeted advertisement to the first user device based on the first user identity data.

In some non-limiting embodiments, the advertisement network system may generate a tracking token based on the first targeted advertisement. Additionally or alternatively, encrypting the first targeted advertisement may include encrypting the first targeted advertisement and the tracking token to form a second ciphertext. Additionally or alternatively, the second ciphertext may include the first encrypted targeted advertisement. Additionally or alternatively, communicating the first encrypted targeted advertisement and the first pseudo-identity data to the mediator system may include communicating the second ciphertext and the first pseudo-identity data to the mediator system. Additionally or alternatively, receiving the first encrypted targeted advertisement may include receiving the second ciphertext. Additionally or alternatively, decrypting the first encrypted targeted advertisement may include decrypting the second ciphertext to form the first targeted advertisement and the tracking token.

In some non-limiting embodiments, the at least one publisher system may include a first publisher system. Additionally or alternatively, the first user device may communicate the first targeted advertisement and the tracking token to the first publisher system. Additionally or alternatively, the first publisher system may present the first targeted advertisement to the user. Additionally or alternatively, the first publisher system may communicate the tracking token to the mediator system. Additionally or alternatively, the mediator system may communicate the tracking token to the advertisement network system.

According to non-limiting embodiments, provided is a system for maintaining user privacy in advertisement networks. In some non-limiting embodiments, the system for maintaining user privacy in advertisement networks may include a first user device configured to receive first persona data associated with a first user from at least one publisher system. The first user device may generalize the first persona data to form first generalized persona data. The first user device may generate a session key. The first user device may encrypt the first generalized persona data and the session key with a first public key of an advertisement network system to form a first ciphertext. The first user device may communicate the first ciphertext and first user identity data to a mediator system. The first user identity data may be associated with an identity of the first user. The first user device may receive a first encrypted targeted advertisement based on the first generalized persona data from the advertisement network system via the mediator system. The first user device may decrypt the first encrypted targeted advertisement with the session key to form a first targeted advertisement.

In some non-limiting embodiments, the first persona data may include a first vector. Additionally or alternatively, a plurality of users may include the first user. Additionally or alternatively, each respective user of the plurality of users may be associated with respective persona data, which may include a respective vector. Additionally or alternatively, each respective vector may include a plurality of respective attributes. In some non-limiting embodiments, generalizing the first persona data may include the mediator system being configured to, for each respective attribute of the plurality of respective attributes generate a tree, which may include a plurality of leaf nodes and a plurality of non-leaf nodes. Additionally or alternatively, each leaf node may be associated with at least one possible value of the respective attribute. Additionally or alternatively, each non-leaf node may be associated with a hierarchical category associated with at least two leaf nodes. The mediator system and/or the plurality of user devices may count a number of users of the plurality of users having a respective attribute value for the respective attribute associated with the at least one possible value of each leaf node. Additionally or alternatively, for each respective non-leaf node, a sum of the number of users for all leaf nodes under the respective non-leaf node may be determined. Additionally or alternatively, the first customer device may be configured to, for each respective attribute of the first vector, determine whether the number of users of the plurality of users having the respective attribute value for the respective attribute associated with the at least one possible value of a respective leaf node exceeds a threshold. Additionally or alternatively, if the number of users exceeds the threshold, the respective attribute value for the respective attribute may be retained. Additionally or alternatively, if the number of users does not exceed the threshold, the respective attribute value for the respective attribute may be replaced with the hierarchical category associated with a first non-leaf node for which the sum exceeds the threshold above the respective leaf node.

In some non-limiting embodiments, a plurality of user devices may include a respective user device for each respective user of the plurality of users. Additionally or alternatively, counting the number of users may include, for each respective attribute of the plurality of respective attributes, each respective user device being configured to encrypt the respective attribute value of the respective attribute with a second public key to form an encrypted respective attribute value. Additionally or alternatively, each respective user device may include a respective share of a private key associated with the second public key. Additionally or alternatively, each respective user device may be configured to transmit a message, which may include the encrypted respective attribute value, to the mediator system. Additionally or alternatively, the mediator system may be configured to combine the messages from each respective user device with additive homomorphic encryption to form a combined message. Additionally or alternatively, the mediator system may be configured to transmit the combined message to each respective user device. Additionally or alternatively, each respective user device may be configured to decrypt a share of the combined message using the respective share of the private key of the respective user device. Additionally or alternatively, each respective user device may be configured to transmit the share of the combined message to the mediator system. Additionally or alternatively, the mediator system may be configured to combine the shares of the combined message from each respective user device to form a sum of the messages. In some non-limiting embodiments, the number of users may be based on the sum of the messages.

In some non-limiting embodiments, the mediator system may generate first pseudo-identity data associated with the first user identity data. Additionally or alternatively, the mediator system may communicate the first ciphertext and the first pseudo-identity data to the advertisement network system.

In some non-limiting embodiments, the advertisement network system may decrypt the first ciphertext with a first private key of the advertisement network to form the first generalized persona data and the session key. Additionally or alternatively, the advertisement network system may determine the first targeted advertisement based on the first generalized persona data. Additionally or alternatively, the advertisement network system may encrypt the first targeted advertisement with the session key to form the first encrypted targeted advertisement. Additionally or alternatively, the advertisement network system may communicate the first encrypted targeted advertisement and the first pseudo-identity data to the mediator system.

In some non-limiting embodiments, the mediator system may determine the first user identity data based on the first pseudo-identity data. Additionally or alternatively, the mediator system may communicate the first encrypted targeted advertisement to the first user device based on the first user identity data.

In some non-limiting embodiments, the advertisement network system may generate a tracking token based on the first targeted advertisement. Additionally or alternatively, encrypting the first targeted advertisement may include encrypting the first targeted advertisement and the tracking token to form a second ciphertext. Additionally or alternatively, the second ciphertext may include the first encrypted targeted advertisement. Additionally or alternatively, communicating the first encrypted targeted advertisement and the first pseudo-identity data to the mediator system may include communicating the second ciphertext and the first pseudo-identity data to the mediator system. Additionally or alternatively, receiving the first encrypted targeted advertisement may include receiving the second ciphertext. Additionally or alternatively, decrypting the first encrypted targeted advertisement may include decrypting the second ciphertext to form the first targeted advertisement and the tracking token.

In some non-limiting embodiments, the at least one publisher system may include a first publisher system. Additionally or alternatively, the first user device may communicate the first targeted advertisement and the tracking token to the first publisher system. Additionally or alternatively, the first publisher system may present the first targeted advertisement to the user. Additionally or alternatively, the first publisher system may communicate the tracking token to the mediator system. Additionally or alternatively, the mediator system may communicate the tracking token to the advertisement network system.

According to non-limiting embodiments, provided is a computer program product for maintaining user privacy in advertisement networks. The computer program product may include at least one non-transitory computer-readable medium including one or more instructions that, when executed by at least one processor, cause the at least one processor to receive first persona data associated with a first user from at least one publisher system. The first persona data may be generalized to form first generalized persona data. A session key may be generated. The first generalized persona data and the session key may be encrypted with a first public key of an advertisement network system to form a first ciphertext. The first ciphertext and first user identity data may be communicated to a mediator system. The first user identity data may be associated with an identity of the first user. A first encrypted targeted advertisement may be received based on the first generalized persona data from the advertisement network system via the mediator system. The first encrypted targeted advertisement may be decrypted with the session key to form a first targeted advertisement.

In some non-limiting embodiments, the first persona data may include a first vector. Additionally or alternatively, a plurality of users may include the first user. Additionally or alternatively, each respective user of the plurality of users may be associated with respective persona data, which may include a respective vector. Additionally or alternatively, each respective vector may include a plurality of respective attributes. In some non-limiting embodiments, generalizing the first persona data may include, for each respective attribute of the plurality of respective attributes, generating a tree with a plurality of leaf nodes and a plurality of non-leaf nodes. Additionally or alternatively, each leaf node may be associated with at least one possible value of the respective attribute. Additionally or alternatively, each non-leaf node may be associated with a hierarchical category associated with at least two leaf nodes. A number of users of the plurality of users having a respective attribute value for the respective attribute associated with the at least one possible value of each leaf node may be counted. Additionally or alternatively, for each respective non-leaf node, a sum of the number of users for all leaf nodes under the respective non-leaf node may be determined. In some non-limiting embodiments, for each respective attribute of the first vector, whether the number of users of the plurality of users having the respective attribute value for the respective attribute associated with the at least one possible value of a respective leaf node exceeds a threshold may be determined. Additionally or alternatively, if the number of users exceeds the threshold, the respective attribute value for the respective attribute may be retained. Additionally or alternatively, if the number of users does not exceed the threshold, the respective attribute value for the respective attribute may be replaced with the hierarchical category associated with a first non-leaf node for which the sum exceeds the threshold above the respective leaf node.

In some non-limiting embodiments, counting the number of users may include, for each respective attribute of the plurality of respective attributes, encrypting the respective attribute value of the respective attribute with a second public key to form an encrypted respective attribute value. Additionally or alternatively, the computer program product may store a respective share of a private key associated with the second public key. Additionally or alternatively, a message, which may include the encrypted respective attribute value, may be transmitted to the mediator system. Additionally or alternatively, a combined message may be received from the mediator system. Additionally or alternatively, the combined message may be associated with a combination of the messages from each respective user based on additive homomorphic encryption. Additionally or alternatively, a share of the combined message may be decrypted using the respective share of the private key. Additionally or alternatively, the share of the combined message may be transmitted to the mediator system.

In some non-limiting embodiments, the mediator system may generate first pseudo-identity data associated with the first user identity data. Additionally or alternatively, the mediator system may communicate the first ciphertext and the first pseudo-identity data to the advertisement network system.

In some non-limiting embodiments, the advertisement network system may decrypt the first ciphertext with a first private key of the advertisement network to form the first generalized persona data and the session key. Additionally or alternatively, the advertisement network system may determine the first targeted advertisement based on the first generalized persona data. Additionally or alternatively, the advertisement network system may encrypt the first targeted advertisement with the session key to form the first encrypted targeted advertisement. Additionally or alternatively, the advertisement network system may communicate the first encrypted targeted advertisement and the first pseudo-identity data to the mediator system.

In some non-limiting embodiments, the mediator system may determine the first user identity data based on the first pseudo-identity data. Additionally or alternatively, the mediator system may communicate the first encrypted targeted advertisement to the first user device based on the first user identity data.

In some non-limiting embodiments, receiving the first encrypted targeted advertisement may include receiving a second ciphertext, which may include the first encrypted first targeted advertisement and an encrypted tracking token. Additionally or alternatively, decrypting the first encrypted targeted advertisement may include decrypting the second ciphertext to form the first targeted advertisement and a tracking token.

In some non-limiting embodiments, the advertisement network system may generate a tracking token based on the first targeted advertisement. Additionally or alternatively, encrypting the first targeted advertisement may include encrypting the first targeted advertisement and the tracking token to form a second ciphertext. Additionally or alternatively, the second ciphertext may include the first encrypted targeted advertisement. Additionally or alternatively, communicating the first encrypted targeted advertisement and the first pseudo-identity data to the mediator system may include communicating the second ciphertext and the first pseudo-identity data to the mediator system. Additionally or alternatively, receiving the first encrypted targeted advertisement may include receiving the second ciphertext. Additionally or alternatively, decrypting the first encrypted targeted advertisement may include decrypting the second ciphertext to form the first targeted advertisement and the tracking token.

In some non-limiting embodiments, the at least one publisher system may include a first publisher system. Additionally or alternatively, the first user device may communicate the first targeted advertisement and the tracking token to the first publisher system. Additionally or alternatively, the first publisher system may present the first targeted advertisement to the user. Additionally or alternatively, the first publisher system may communicate the tracking token to the mediator system. Additionally or alternatively, the mediator system may communicate the tracking token to the advertisement network system.

Further embodiments are set forth in the following numbered clauses:

Clause 1: A method, comprising: receiving, with a first user device, first persona data associated with a first user from at least one publisher system; generalizing, with the first user device, the first persona data to form first generalized persona data; generating, with the first user device, a session key; encrypting, with the first user device, the first generalized persona data and the session key with a first public key of an advertisement network system to form a first ciphertext; communicating, with the first user device, the first ciphertext and first user identity data to a mediator system, the first user identity data associated with an identity of the first user; receiving, with the first user device, a first encrypted targeted advertisement based on the first generalized persona data from the advertisement network system via the mediator; and decrypting, with the first user device, the first encrypted targeted advertisement with the session key to form a first targeted advertisement.

Clause 2: The method of clause 1, wherein the first persona data comprises a first vector, wherein a plurality of users comprises the first user, wherein each respective user of the plurality of users is associated with respective persona data comprising a respective vector, wherein each respective vector comprises a plurality of respective attributes, wherein generalizing the first persona data comprises: for each respective attribute of the plurality of respective attributes: generating a tree comprising a plurality of leaf nodes and a plurality of non-leaf nodes, each leaf node associated with at least one possible value of the respective attribute, each non-leaf node associated with a hierarchical category associated with at least two leaf nodes; counting a number of users of the plurality of users having a respective attribute value for the respective attribute associated with the at least one possible value of each leaf node; and for each respective non-leaf node, determining a sum of the number of users for all leaf nodes under the respective non-leaf node; and for each respective attribute of the first vector: determining whether the number of users of the plurality of users having the respective attribute value for the respective attribute associated with the at least one possible value of a respective leaf node exceeds a threshold; if the number of users exceeds the threshold, retaining the respective attribute value for the respective attribute; and if the number of users does not exceed the threshold, replacing the respective attribute value for the respective attribute with the hierarchical category associated with a first non-leaf node for which the sum exceeds the threshold above the respective leaf node.

Clause 3: The method of any one of clauses 1 or 2, wherein a plurality of user devices comprises a respective user device for each respective user of the plurality of users, wherein counting the number of users comprises: for each respective attribute of the plurality of respective attributes: encrypting, with each respective user device, the respective attribute value of the respective attribute with a second public key to form an encrypted respective attribute value, wherein each respective user device comprises a respective share of a private key associated with the second public key; transmitting, with each respective user device, a message comprising the encrypted respective attribute value to the mediator system; combining, by the mediator system, the messages from each respective user device with additive homomorphic encryption to form a combined message; transmitting, by the mediator system, the combined message to each respective user device; decrypting, with each respective user device, a share of the combined message using the respective share of the private key of the respective user device; transmitting, with each respective user device, the share of the combined message to the mediator system; and combining, with the mediator system, the shares of the combined message from each respective user device to form a sum of the messages, wherein the number of users is based on the sum of the messages.

Clause 4: The method of any preceding clause, further comprising: generating, with the mediator system, first pseudo-identity data associated with the first user identity data; and communicating, with the mediator system, the first ciphertext and the first pseudo-identity data to the advertisement network system.

Clause 5: The method of any preceding clause, further comprising: decrypting, with the advertisement network system, the first ciphertext with a first private key of the advertisement network to form the first generalized persona data and the session key; determining, with the advertisement network system, the first targeted advertisement based on the first generalized persona data; encrypting, with the advertisement network system, the first targeted advertisement with the session key to form the first encrypted targeted advertisement; and communicating, with the advertisement network system, the first encrypted targeted advertisement and the first pseudo-identity data to the mediator system.

Clause 6: The method of any preceding clause, further comprising: determining, with the mediator system, the first user identity data based on the first pseudo-identity data; and communicating, with the mediator system, the first encrypted targeted advertisement to the first user device based on the first user identity data.

Clause 7: The method of any preceding clause, further comprising: generating, with the advertisement network system, a tracking token based on the first targeted advertisement, wherein encrypting the first targeted advertisement comprises encrypting the first targeted advertisement and the tracking token to form a second ciphertext, the second ciphertext comprising the first encrypted targeted advertisement, wherein communicating the first encrypted targeted advertisement and the first pseudo-identity data to the mediator system comprises communicating the second ciphertext and the first pseudo-identity data to the mediator system, wherein receiving the first encrypted targeted advertisement comprises receiving the second ciphertext, and wherein decrypting the first encrypted targeted advertisement comprises decrypting the second ciphertext to form the first targeted advertisement and the tracking token.

Clause 8: The method of any preceding clause, wherein the at least one publisher system comprises a first publisher system, the method further comprising: communicating, with the first user device, the first targeted advertisement and the tracking token to the first publisher system; presenting, with the first publisher system, the first targeted advertisement to the user; communicating, with the first publisher system, the tracking token to the mediator system; and communicating, with the mediator system, the tracking token to the advertisement network system.

Clause 9. A system, comprising: a first user device configured to: receive first persona data associated with a first user from at least one publisher system; generalize the first persona data to form first generalized persona data; generate a session key; encrypt the first generalized persona data and the session key with a first public key of an advertisement network system to form a first ciphertext; communicate the first ciphertext and first user identity data to a mediator system, the first user identity data associated with an identity of the first user; receive a first encrypted targeted advertisement based on the first generalized persona data from the advertisement network system via the mediator; and decrypt the first encrypted targeted advertisement with the session key to form a first targeted advertisement.

Clause 10: The system of clause 9, wherein the first persona data comprises a first vector, wherein a plurality of users comprises the first user, wherein each respective user of the plurality of users is associated with respective persona data comprising a respective vector, wherein each respective vector comprises a plurality of respective attributes, wherein generalizing the first persona data comprises: the mediator system being configured to, for each respective attribute of the plurality of respective attributes: generate a tree comprising a plurality of leaf nodes and a plurality of non-leaf nodes, each leaf node associated with at least one possible value of the respective attribute, each non-leaf node associated with a hierarchical category associated with at least two leaf nodes; count a number of users of the plurality of users having a respective attribute value for the respective attribute associated with the at least one possible value of each leaf node; and for each respective non-leaf node, determine a sum of the number of users for all leaf nodes under the respective non-leaf node; and the first user device being configured to, for each respective attribute of the first vector: determine whether the number of users of the plurality of users having the respective attribute value for the respective attribute associated with the at least one possible value of a respective leaf node exceeds a threshold; if the number of users exceeds the threshold, retain the respective attribute value for the respective attribute; and if the number of users does not exceed the threshold, replace the respective attribute value for the respective attribute with the hierarchical category associated with a first non-leaf node for which the sum exceeds the threshold above the respective leaf node.

Clause 11: The system of any one of clauses 9 or 10, wherein a plurality of user devices comprises a respective user device for each respective user of the plurality of users, wherein counting the number of users comprises, for each respective attribute of the plurality of respective attributes: each respective user device being configured to encrypt the respective attribute value of the respective attribute with a second public key to form an encrypted respective attribute value, wherein each respective user device comprises a respective share of a private key associated with the second public key; each respective user device being configured to transmit a message comprising the encrypted respective attribute value to the mediator system; the mediator system being configured to combine the messages from each respective user device with additive homomorphic encryption to form a combined message; the mediator system being configured to transmit the combined message to each respective user device; each respective user device being configured to decrypt a share of the combined message using the respective share of the private key of the respective user device; each respective user device being configured to transmit the share of the combined message to the mediator system; and the mediator system being configured to combine the shares of the combined message from each respective user device to form a sum of the messages, wherein the number of users is based on the sum of the messages.

Clause 12: The system of any one of clauses 9-11, wherein the mediator system is configured to: generate first pseudo-identity data associated with the first user identity data; and communicate the first ciphertext and the first pseudo-identity data to the advertisement network system.

Clause 13: The system of any one of clauses 9-12, wherein the advertisement network system is configured to: decrypt the first ciphertext with a first private key of the advertisement network to form the first generalized persona data and the session key; determine the first targeted advertisement based on the first generalized persona data; encrypt the first targeted advertisement with the session key to form the first encrypted targeted advertisement; and communicate the first encrypted targeted advertisement and the first pseudo-identity data to the mediator system.

Clause 14: The system of any one of clauses 9-13, wherein the mediator system is configured to: determine the first user identity data based on the first pseudo-identity data; and communicate the first encrypted targeted advertisement to the first user device based on the first user identity data.

Clause 15: The system of any one of clauses 9-14, wherein the advertisement network system is configured to: generate a tracking token based on the first targeted advertisement, wherein encrypting the first targeted advertisement comprises encrypting the first targeted advertisement and the tracking token to form a second ciphertext, the second ciphertext comprising the first encrypted targeted advertisement, wherein communicating the first encrypted targeted advertisement and the first pseudo-identity data to the mediator system comprises communicating the second ciphertext and the first pseudo-identity data to the mediator system, wherein receiving the first encrypted targeted advertisement comprises receiving the second ciphertext, and wherein decrypting the first encrypted targeted advertisement comprises decrypting the second ciphertext to form the first targeted advertisement and the tracking token.

Clause 16: The system of any one of clauses 9-15, wherein the at least one publisher system comprises a first publisher system, wherein: the first user device is configured to communicate the first targeted advertisement and the tracking token to the first publisher system; the first publisher system is configured to present the first targeted advertisement to the user; the first publisher system is configured to communicate the tracking token to the mediator system; and the mediator system is configured to communicate the tracking token to the advertisement network system.

Clause 17: A computer program product comprising at least one non-transitory computer-readable medium including one or more instructions that, when executed by at least one processor, cause the at least one processor to: receive first persona data associated with a first user from at least one publisher system; generalize the first persona data to form first generalized persona data; generate a session key; encrypt the first generalized persona data and the session key with a first public key of an advertisement network system to form a first ciphertext; communicate the first ciphertext and first user identity data to a mediator system, the first user identity data associated with an identity of the first user; receive a first encrypted targeted advertisement based on the first generalized persona data from the advertisement network system via the mediator; and decrypt the first encrypted targeted advertisement with the session key to form a first targeted advertisement.

Clause 18: The computer program product of clause 17, wherein the first persona data comprises a first vector, wherein a plurality of users comprises the first user, wherein each respective user of the plurality of users is associated with respective persona data comprising a respective vector, wherein each respective vector comprises a plurality of respective attributes, wherein generalizing the first persona data comprises: for each respective attribute of the plurality of respective attributes: generating a tree comprising a plurality of leaf nodes and a plurality of non-leaf nodes, each leaf node associated with at least one possible value of the respective attribute, each non-leaf node associated with a hierarchical category associated with at least two leaf nodes; counting a number of users of the plurality of users having a respective attribute value for the respective attribute associated with the at least one possible value of each leaf node; and for each respective non-leaf node, determining a sum of the number of users for all leaf nodes under the respective non-leaf node; and for each respective attribute of the first vector: determining whether the number of users of the plurality of users having the respective attribute value for the respective attribute associated with the at least one possible value of a respective leaf node exceeds a threshold; if the number of users exceeds the threshold, retaining the respective attribute value for the respective attribute; and if the number of users does not exceed the threshold, replacing the respective attribute value for the respective attribute with the hierarchical category associated with a first non-leaf node for which the sum exceeds the threshold above the respective leaf node.

Clause 19: The computer program product of any one of clauses 17 or 18, wherein counting the number of users comprises: for each respective attribute of the plurality of respective attributes: encrypting the respective attribute value of the respective attribute with a second public key to form an encrypted respective attribute value, wherein the computer program product stores a respective share of a private key associated with the second public key; transmitting a message comprising the encrypted respective attribute value to the mediator system; receiving a combined message from the mediator system, the combined message associated with a combination of the messages from each respective user based on additive homomorphic encryption; decrypting a share of the combined message using the respective share of the private key; and transmitting the share of the combined message to the mediator system.

Clause 20: The computer program product of any one of clauses 17-19, wherein receiving the first encrypted targeted advertisement comprises receiving a second ciphertext comprising the first encrypted first targeted advertisement and an encrypted tracking token, and wherein decrypting the first encrypted targeted advertisement comprises decrypting the second ciphertext to form the first targeted advertisement and a tracking token.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which.

DESCRIPTION

Figure 1:
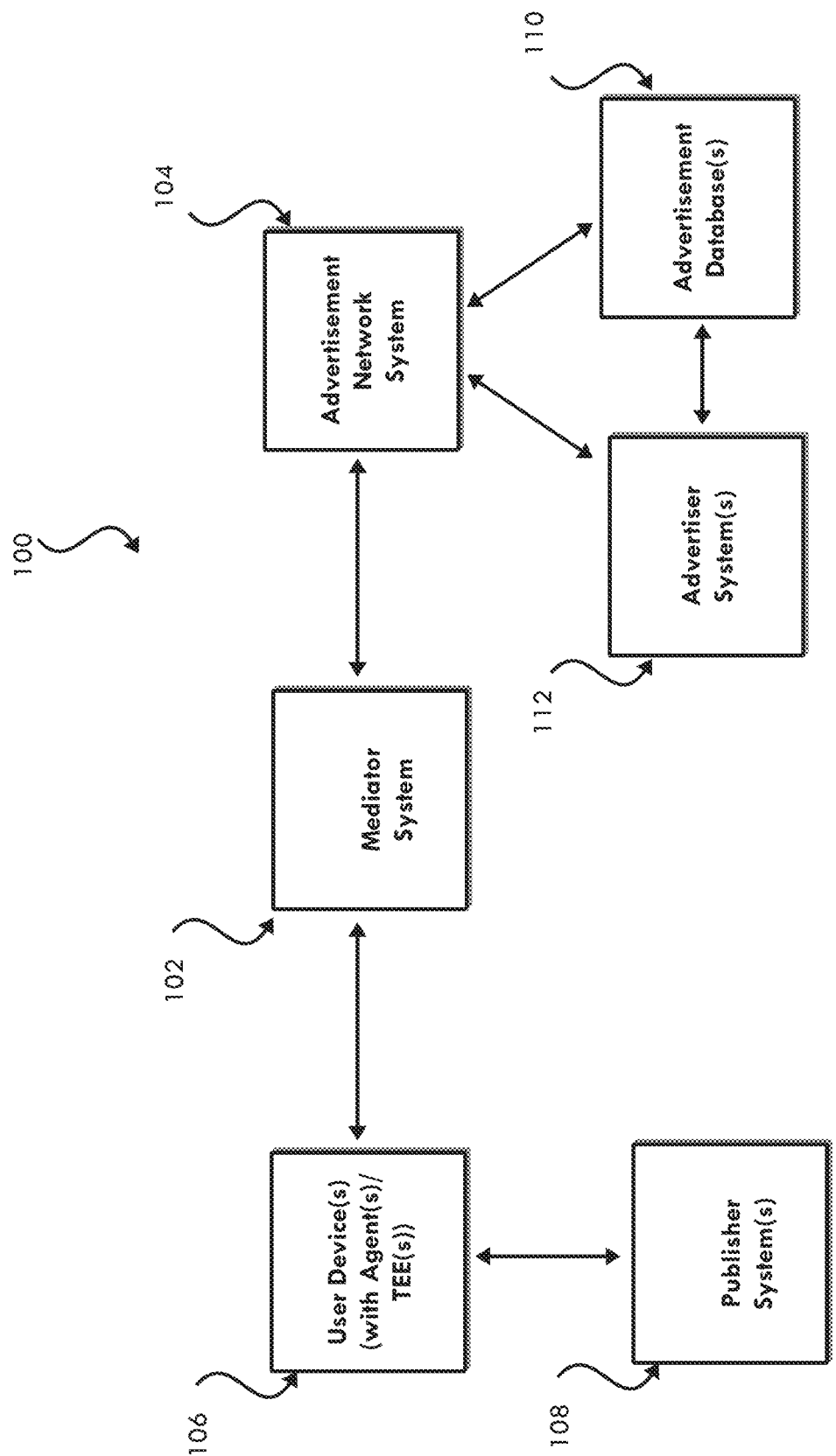
FIG. 1 is a diagram of a non-limiting embodiment of an environment in which systems, methods, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a payment token, and/or the like). In some non-limiting embodiments, an issuer institution may provide an account identifier (e.g., a PAN, a payment token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a payment token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the term "payment token" may refer to an identifier that is used as a substitute or replacement identifier for an account identifier, such as a PAN. Payment tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of payment tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments, a payment token may be "format preserving" and may have a numeric format that conforms to the account identifiers used in existing payment processing networks (e.g., ISO 8583 financial transaction message format). In some non-limiting embodiments, a payment token may be used in place of a PAN to initiate, authorize, settle, or resolve a payment transaction or represent the original credential in other systems where the original credential would typically be provided. In some non-limiting embodiments, a payment token value may be generated such that the recovery of the original PAN or other account identifier from the payment token value may not be computationally derived (e.g., with a one-way hash or other cryptographic function). Further, in some non-limiting embodiments, the payment token format may be configured to allow the entity receiving the payment token to identify it as a payment token and recognize the entity that issued the payment token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "payment token requestor" may refer to an entity that is seeking to implement tokenization according to embodiments of the presently disclosed subject matter. For example, the payment token requestor may initiate a request that a PAN be tokenized by submitting a payment token request message to a payment token service provider. Additionally or alternatively, a payment token requestor may no longer need to store a PAN associated with a payment token once the requestor has received the payment token in response to a payment token request message. In some non-limiting embodiments, the requestor may be an application, a device, a process, or a system that is configured to perform actions associated with payment tokens. For example, a requestor may request registration with a network payment token system, request payment token generation, payment token activation, payment token de-activation, payment token exchange, other payment token lifecycle management related processes, and/or any other payment token related processes. In some non-limiting embodiments, a requestor may interface with a network payment token system through any suitable communication network and/or protocol (e.g., using HTTPS, SOAP, and/or an XML interface among others). For example, a payment token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments, a payment token requestor may request payment tokens for multiple domains and/or channels. Additionally or alternatively, a payment token requestor may be registered and identified uniquely by the payment token service provider within the tokenization ecosystem. For example, during payment token requestor registration, the payment token service provider may formally process a payment token requestor's application to participate in the payment token service system. In some non-limiting embodiments, the payment token service provider may collect information pertaining to the nature of the requestor and relevant use of payment tokens to validate and formally approve the payment token requestor and establish appropriate domain restriction controls. Additionally or alternatively, successfully registered payment token requestors may be assigned a payment token requestor identifier that may also be entered and maintained within the payment token vault. In some non-limiting embodiments, payment token requestor identifiers may be revoked and/or payment token requestors may be assigned new payment token requestor identifiers. In some non-limiting embodiments, this information may be subject to reporting and audit by the payment token service provider.

As used herein, the term a "payment token service provider" may refer to an entity including one or more server computers in a payment token service system that generates, processes, and maintains payment tokens. For example, the payment token service provider may include or be in communication with a payment token vault where the generated payment tokens are stored. Additionally or alternatively, the payment token vault may maintain one-to-one mapping between a payment token and a PAN represented by the payment token. In some non-limiting embodiments, the payment token service provider may have the ability to set aside licensed BINs as payment token BINs to issue payment tokens for the PANs that may be submitted to the payment token service provider. In some non-limiting embodiments, various entities of a tokenization ecosystem may assume the roles of the payment token service provider. For example, payment networks and issuers or their agents may become the payment token service provider by implementing the payment token services according to non-limiting embodiments of the presently disclosed subject matter. Additionally or alternatively, a payment token service provider may provide reports or data output to reporting tools regarding approved, pending, or declined payment token requests, including any assigned payment token requestor ID. The payment token service provider may provide data output related to payment token-based transactions to reporting tools and applications and present the payment token and/or PAN as appropriate in the reporting output. In some non-limiting embodiments, the EMVCo standards organization may publish specifications defining how tokenized systems may operate. For example, such specifications may be informative, but they are not intended to be limiting upon any of the presently disclosed subject matter.

As used herein, the term "payment token vault" may refer to a repository that maintains established payment token-to-PAN mappings. For example, the payment token vault may also maintain other attributes of the payment token requestor that may be determined at the time of registration and/or that may be used by the payment token service provider to apply domain restrictions or other controls during transaction processing. In some non-limiting embodiments, the payment token vault may be a part of a payment token service system. For example, the payment token vault may be provided as a part of the payment token service provider. Additionally or alternatively, the payment token vault may be a remote repository accessible by the payment token service provider. In some non-limiting embodiments, payment token vaults, due to the sensitive nature of the data mappings that are stored and managed therein, may be protected by strong underlying physical and logical security. Additionally or alternatively, a payment token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. As used herein, the term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments of the disclosed subject matter are directed to systems, methods, and computer program products for privacy in networks, including, but not limited to, maintaining user privacy in advertisement networks. For example, non-limiting embodiments of the disclosed subject matter provide generalizing persona data (e.g., from one or more publishers) and anonymizing user data with at least one of encrypting persona data separately from identity data and/or replacing identity data with pseudo-identity data. Such embodiments provide techniques and systems that preserve privacy in both advertisement delivery and billing. Additionally or alternatively, such embodiments provide techniques and systems that enable a comprehensive persona across multiple publishers (e.g., IoT devices, web services, mobile applications, and/or the like). Additionally or alternatively, such embodiments provide techniques and systems that enable persona generalization without revealing the (non-generalized) persona. Additionally or alternatively, such embodiments provide techniques and systems that balance the trade-off between advertisers' motivations for providing a system for personalized advertising and a user's motivations to preserve the privacy of the user. Additionally or alternatively, such embodiments provide techniques and systems that allow an advertiser to target a demographic (e.g., a subset of user population sharing some given characteristics) instead of a specific individual (e.g., using only anonymized persona data without identity data). Additionally or alternatively, such anonymized persona data (with identifiable information stripped) may be generalized to a level that provides sufficient detail for personalization but remains more general than a threshold under which attributes of the persona may be used to discover an identity of the user. Additionally or alternatively, non-limiting embodiments of the disclosed subject matter further provide a mediator coordinating generalization, anonymization, and accounting. Such embodiments provide techniques and systems that allow the mediator to learn only the user's identity (but not persona data) and allow the advertising network to learn only privacy-preserving persona data (but not identity data). Additionally or alternatively, non-limiting embodiments of the disclosed subject matter further provide tracking token generation and encryption of advertisements with such tokens. Such embodiments provide techniques and systems that enable accurate and anonymous record keeping and preserving privacy/anonymity in billing. Additionally or alternatively, non-limiting embodiments of the disclosed subject matter further provide a privacy dashboard. Such embodiments provide techniques and systems that enable users to have control over data sharing (e.g., level/threshold of generality of generalized data and/or the like).

Non-limiting embodiments or aspects allow for users to receive targeted and/or personalized communications from third-party networks, e.g., advertisement networks, without the risk of exposing their private data or identification to such third-party networks or systems. Non-limiting embodiments or aspects utilize a unique arrangement of a mediator system that interfaces with a user and/or user device (e.g., which in turn may interface with publisher devices such as IoT devices and/or the like) to protect the identity of specific user information from identification by the third-party network or system. Non-limiting embodiments or aspects implement a combination of a private/public key architecture, anonymization technique, and generalization technique that protects the identity of specific user information from identification by the third-party network or system. Non-limiting embodiments or aspects implement a private/public key architecture that protects the specific user information from discovery by a mediator system.

For the purpose of illustration, in the following description, while the presently disclosed subject matter is described with respect to systems, methods, and computer program products for maintaining user privacy, e.g., in advertisement networks, one skilled in the art will recognize that the disclosed subject matter is not limited to the illustrative embodiments. For example, the methods, systems, and computer program products described herein may be used with a wide variety of settings, such as maintaining privacy in any suitable setting, e.g., computer networks, public databases, and/or the like.

Referring now to FIG. 1, FIG. 1 is a diagram of a non-limiting embodiment of an environment 100 in which systems, products, and/or methods, as described herein, may be implemented. As shown in FIG. 1, environment 100 includes mediator system 102, advertisement network system 104, user device(s) 106, publisher system(s) 108, advertisement database(s) 110, and advertiser system(s) 112.

Mediator system 102 may include one or more devices capable of receiving information from and/or communicating information to user device(s) 106 and/or advertisement network system 104 (e.g., via at least one network and/or the like, as described herein). For example, mediator system 102 may include a computing device, such as a server (e.g., a transaction processing server, a (trusted) third party server, and/or the like), a group of servers, and/or other like devices. In some non-limiting embodiments, mediator system 102 may be associated with a transaction service provider as described herein. In some non-limiting embodiments, mediator system 102 may be in communication with a data storage device, which may be local or remote to mediator system 102. In some non-limiting embodiments, mediator system 102 may be capable of receiving information from, storing information in, communicating information to, or searching information stored in the data storage device.

Advertisement network system 104 may include one or more devices capable of receiving information and/or communicating information to mediator system 102, advertisement database(s) 110, advertiser system(s) 112, and/or the like (e.g., via at least one network and/or the like, as described herein). For example, advertisement network system 104 may include a computing device, such as a server, a group of servers, and/or other like devices. In some non-limiting embodiments, advertisement network system 104 may be associated with at least one advertising network, e.g., an entity that connects advertisers and at least one targeted audience (e.g., group of users and/or the like) of such advertisers. In some non-limiting embodiments, advertisement network system 104 may be associated with at least one merchant institution, at least one issuer institution, at least one acquirer institution, at least one manufacturing institution, at least one service providing institution, at least one advertising agency, at least one search engine providing institution, at least one website provider, at least one mobile application provider, any combination thereof, and/or the like, as described herein.

User device(s) 106 may include one or more devices capable of receiving information from and/or communicating information to mediator system 102, publisher system(s) 108, and/or the like (e.g., via a network and/or the like, as described herein). Additionally or alternatively, each user device 106 may include a device capable of receiving information from and/or communicating information to other user devices 106 (e.g., via a network and/or the like, as described herein). For example, user device 106 may include a client device and/or the like. In some non-limiting embodiments, user device 106 may include may include at least one computing device, e.g., one or more computers, portable computers, laptop computers, tablet computers, mobile devices, cellular phones, wearable devices (e.g., watches, glasses, lenses, clothing, and/or the like), PDAs, Internet of things (IoT) device, and/or the like. In some non-limiting embodiments, user device 106 may or may not be capable of receiving information (e.g., from publisher system(s) 108 or from another user device 106) via a short-range wireless communication connection (e.g., an NFC communication connection, an RFID communication connection, a Bluetooth® communication connection, a Zigbee® communication connection, and/or the like), and/or communicating information (e.g., to publisher system(s) 108) via a short-range wireless communication connection. In some non-limiting embodiments, each user device 106 may include a device capable of executing an agent application in a trusted execution environment (TEE), as described herein.

Publisher system(s) 108 may include one or more devices capable of receiving information from and/or communicating information to user device 106 and/or the like (e.g., via a network and/or the like, as described herein). Publisher system(s) 108 may also include a device capable of receiving information from user device 106 via any suitable network, any suitable communication connection (e.g., an NFC communication connection, an RFID communication connection, a Bluetooth® communication connection, a Zigbee® communication connection, and/or the like), and/or the like, and/or communicating information to user device 106 via the network, the communication connection, and/or the like. In some non-limiting embodiments, publisher system(s) 108 may include a computing device, such as a server, a group of servers, a client device, a group of client devices, and/or other like devices. In some non-limiting embodiments, publisher system(s) 108 may include may include at least one computing device, e.g., one or more Internet of things (IoT) devices, computers, portable computers, laptop computers, tablet computers, mobile devices, cellular phones, wearable devices (e.g., watches, glasses, lenses, clothing, and/or the like), PDAs, and/or the like. In some non-limiting embodiments, publisher system(s) 108 may be associated with at least one publisher (e.g., at least one merchant institution, at least one issuer institution, at least one acquirer institution, at least one manufacturing institution, at least one service providing institution, at least one advertising agency, at least one search engine providing institution, at least one website provider, at least one mobile application provider, any combination thereof, and/or the like), as described herein. For example, a publisher may be any entity that is interacting with a user, communicating with/to a user, collecting data from a user, communicating advertisements/targeted messages to a user, and/or the like, as described herein. In some non-limiting embodiments, publisher system(s) 108 may include one or more client devices. In some non-limiting embodiments, publisher system(s) 108 may include one or more devices, such as computers, computer systems, and/or peripheral devices capable of being used by a publisher to conduct an interaction with a user.

Advertisement databases(s) 110 may include one or more devices capable of receiving information from and/or communicating information to advertisement network system 104, advertiser system(s) 112, and/or the like (e.g., via a network and/or the like, as described herein). For example, advertisement databases(s) 110 may include a computing device, a server, a group of servers, and/or the like. In some non-limiting embodiments, advertisement databases(s) 110 may store a plurality of advertisements (e.g., targeted messages, text, media items (e.g., audio, video, and/or audiovisual items and/or the like), scripts (e.g., scripts programmed to trigger upon an event and/or the like), and/or the like), advertisement templates (e.g., targeted message templates, text templates, media item templates, script templates, and/or the like), and/or the like, as described herein. For example, such advertisements, advertisement templates, and/or the like may be provided by (e.g., communicated from and/or the like) advertiser system(s) 112.

Advertiser systems(s) 112 may include one or more devices capable of receiving information from and/or communicating information to advertisement network system 104, advertisement database(s) 110, and/or the like (e.g., via a network and/or the like, as described herein). For example, advertiser system(s) 112 may include a computing device, a server, a group of servers, and/or the like. In some non-limiting embodiments, advertiser system(s) 112 may provide (e.g., communicate and/or the like) advertisements (e.g., targeted messages, text, media items (e.g., audio, video, and/or audiovisual items and/or the like), scripts (e.g., scripts programmed to trigger upon an event and/or the like), and/or the like), advertisement templates (e.g., targeted message templates, text templates, media item templates, script templates, and/or the like), and/or the like to advertisement database(s) 110, as described herein. In some non-limiting embodiments, advertiser system(s) 112 may be associated with at least one advertiser (e.g., at least one merchant institution, at least one issuer institution, at least one acquirer institution, at least one manufacturing institution, at least one service providing institution, at least one advertising agency, at least one search engine providing institution, at least one website provider, at least one mobile application provider, any combination thereof, and/or the like), as described herein. For example, an advertiser may be any entity that manages (e.g., run, promote, oversee, and/or the like) an advertisement campaign, advertisement strategies, and/or the (e.g., targeted at users).

In some non-limiting embodiments, networks for communication between the system(s), device(s), and/or component(s) of environment 100 may include one or more wired and/or wireless networks. For example, such networks may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
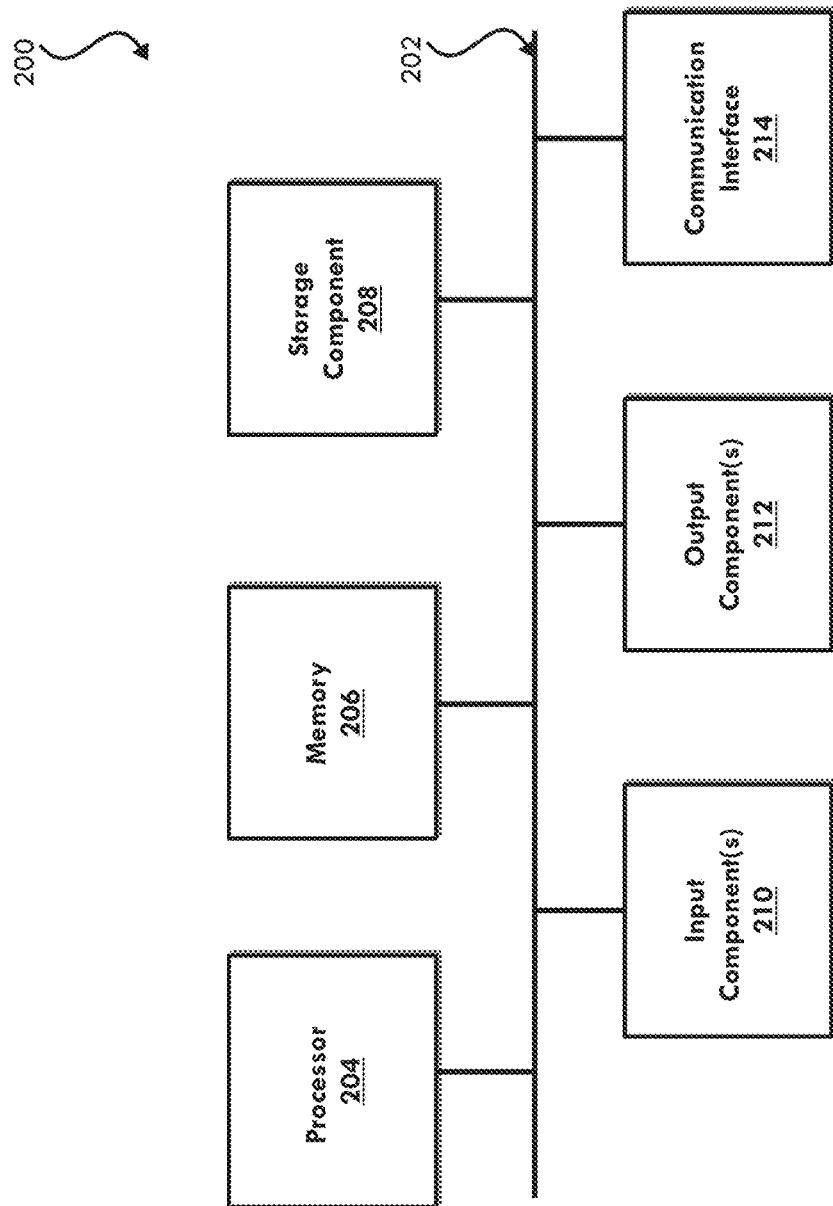
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of mediator system 102, one or more devices of advertisement network system 104, user device(s) 106, one or more devices of publisher system(s) 108, one or more devices of advertisement database(s) 110, and/or one or more devices of advertiser system(s) 112. In some non-limiting embodiments, mediator system 102, advertisement network system 104, user device(s) 106, publisher system(s) 108, advertisement database(s) 110, and/or advertiser system(s) 112 may include at least one device 200 and/or at least one component of device 200. As shown in FIG. 2, device 200 may include bus 202, processor 204, memory 206, storage component 208, input component(s) 210, output component(s) 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component(s) 210 may include a component that permits device 200 to receive information, such as via user input (e.g., a touch screen display, a keyboard, a keypad, a mouse, a button, a switch, a microphone, a camera, and/or the like). Additionally or alternatively, input component(s) 210 may include a sensor for sensing information (e.g., a global positioning system (GPS) component, an accelerometer, a gyroscope, an actuator, and/or the like). Output component(s) 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
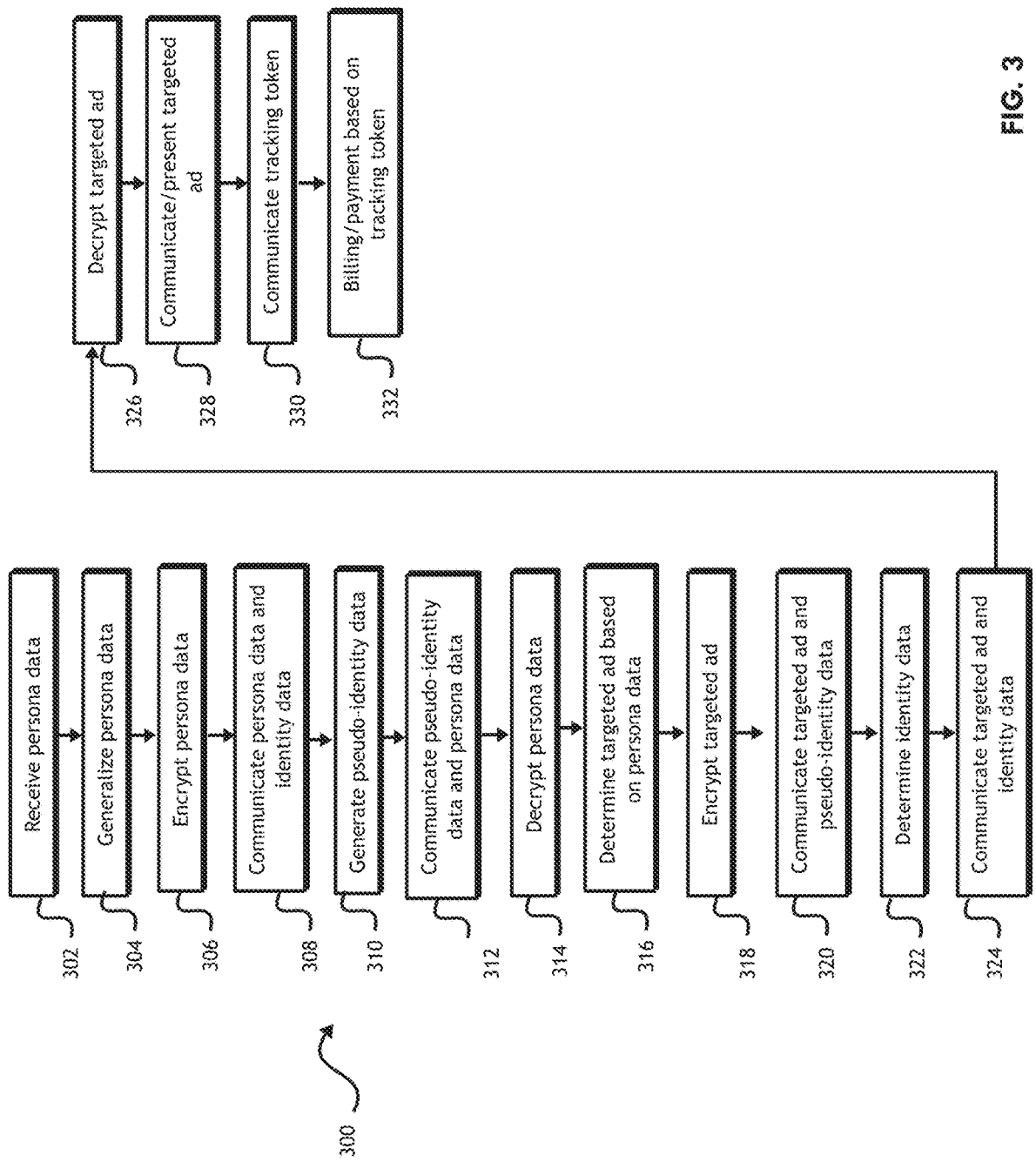
FIG. 3 is a flowchart of a non-limiting embodiment of a process for maintaining user privacy in advertisement networks, according to the principles of the presently disclosed subject matter.

Referring now to FIG. 3, FIG. 3 is a flowchart of a non-limiting embodiment of a process 300 for detecting fraudulent interactions. In some non-limiting embodiments, one or more of the steps of process 300 may be performed (e.g., completely, partially, and/or the like) by user device(s) 106. In some non-limiting embodiments, one or more of the steps of process 300 may be performed (e.g., completely, partially, and/or the like) by another system, another device, another group of systems, or another group of devices, separate from or including user device 106, such as mediator system 102, advertisement network system 104, publisher system(s) 108, advertisement database(s) 110, advertiser system(s) 112, and/or the like.

As shown in FIG. 3, at step 302, process 300 may include receiving persona data. For example, user device(s) 106 may receive persona data associated with at least one user from at least one publisher system 108.

In some non-limiting embodiments, a first user device 106 may receive first persona data associated with a first user from at least one published system 108. The first persona data may include a first vector. Additionally or alternatively, the first vector may include a plurality of attributes and an attribute value for each attribute.

In some non-limiting embodiments, a plurality of users may include the first user. Additionally or alternatively, each respective user of the plurality of users may be associated with respective persona data, which may include a respective vector. In some non-limiting embodiments, each respective vector may include a plurality of respective attributes, and a respective attribute value may be associated with each respective attribute of each respective vector.

In some non-limiting embodiments, a plurality of user devices 106 may include a respective user device 106 for each respective user of the plurality of users. Additionally or alternatively, each of the plurality of respective user devices 106 may receive respective persona data associated with the respective user of the respective user device 106 (e.g., from at least one respective publisher system 108).

As shown in FIG. 3, at step 304, process 300 may include generalizing the persona data. For example, user device(s) 106 and/or mediator system 102 may generalize the respective persona data for each respective user to form respective generalized persona data.

In some non-limiting embodiments, a first user device 106 and/or mediator system 102 may generalize the first persona data to form first generalized persona data.

In some non-limiting embodiments, generalizing the persona data may include, for each respective attribute of the plurality of respective attributes, user device(s) 106 and/or mediator system 102 generating a tree comprising a plurality of leaf nodes and a plurality of non-leaf nodes. Additionally or alternatively, each leaf node may be associated with at least one possible value of the respective attribute. Additionally or alternatively, each non-leaf node may be associated with a hierarchical category associated with at least two leaf nodes (e.g., above such leaf nodes in a hierarchical tree). Additionally or alternatively, a number of users of the plurality of users having a respective attribute value for the respective attribute associated with the at least one possible value of each leaf node may be counted. Additionally or alternatively, for each respective non-leaf node, a sum of the number of users for all leaf nodes under the respective non-leaf node may be determined. In some non-limiting embodiments, for each respective attribute of each respective vector, user device(s) 106 and/or mediator system 102 may determine whether the number of users of the plurality of users having the respective attribute value for the respective attribute associated with the at least one possible value of a respective leaf node exceeds a threshold. If the number of users exceeds the threshold, user device(s) 106 and/or mediator system 102 may retain the respective attribute value for the respective attribute. If the number of users does not exceed the threshold, user device(s) 106 and/or mediator system 102 may replace the respective attribute value for the respective attribute with the hierarchical category associated with a first non-leaf node for which the sum exceeds the threshold above the respective leaf node.

In some non-limiting embodiments, counting the number of users may include, for each respective attribute of the plurality of respective attributes, each respective user device 106 encrypting the respective attribute value of the respective attribute with a second public key to form an encrypted respective attribute value. Additionally or alternatively, each respective user device 106 may have (e.g., store, receive, and/or the like) a respective share of a private key associated with the second public key. Additionally or alternatively, each respective user device 106 may communicate (e.g., transmit and/or the like) a message comprising the encrypted respective attribute value to mediator system 102. Additionally or alternatively, mediator system 102 may combine the messages from each respective user device 106 with additive homomorphic encryption to form a combined message. Additionally or alternatively, mediator system 102 may communicate (e.g., transmit and/or the like) the combined message to each respective user device 106. Additionally or alternatively, each respective user device 106 may decrypt a share of the combined message using the respective share of the private key of the respective user device. Additionally or alternatively, each respective user device 106 may communicate (e.g., transmit and/or the like) the share of the combined message to the mediator system. Additionally or alternatively, mediator system 102 may combine the shares of the combined message from each respective user device 106 to form a sum of the messages. In some non-limiting embodiments, the number of users may be based on the sum of the messages (e.g., be equal to the sum of the messages, by determined based on the sum of the messages, and/or the like).

As shown in FIG. 3, at step 306, process 300 may include encrypting the (generalized) persona data. For example, user device(s) 106 may encrypt the respective generalized persona data for each respective user to form respective encrypted generalized persona data. In some non-limiting embodiments, user device(s) 106 may encrypt the respective generalized persona data with a first public key of an advertisement network system to form the respective encrypted generalized persona data.

In some non-limiting embodiments, user device(s) 106 (e.g., a first user device 106) may generate a session key. For example, user device(s) 106 may randomly generate the session key. Additionally or alternatively, the session key may be generated based on any suitable generation and/or encryption technique.

In some non-limiting embodiments, user device(s) 106 (e.g., a first user device 106) may encrypt the generalized persona data and the session key with the first public key of the advertisement network system to form a ciphertext (e.g., a first ciphertext). Additionally or alternatively, the first ciphertext may include the encrypted generalized persona data and/or the encrypted session key.

As shown in FIG. 3, at step 308, process 300 may include communicating the (encrypted generalized) persona data and identity data. For example, user device(s) 106 (e.g., a first user device 106) may communicate the encrypted generalized persona data (e.g., a first ciphertext that includes the first encrypted generalized persona data) and user identity data (e.g., first user identity data) to mediator system 102. In some non-limiting embodiments, user identity data (e.g., first user identity data) may be associated with an identity of the respective user (e.g., the first user).

As shown in FIG. 3, at step 310, process 300 may include generating pseudo-identity data. For example, mediator system 102 may generate pseudo-identity data (e.g., first pseudo-identity data) associated with the respective user identity data (e.g., first user identity data).

In some non-limiting embodiments, mediator system 102 may randomly generate the pseudo-identity data. Additionally or alternatively, pseudo-identity data may be generated based on any suitable generation and/or encryption technique.

As shown in FIG. 3, at step 312, process 300 may include communicating the (encrypted generalized) persona data and the pseudo-identity data. For example, mediator system 102 may communicate the encrypted generalized persona data (e.g., a first ciphertext that includes the first encrypted generalized persona data) and pseudo-identity data (e.g., first pseudo-identity data) to advertisement network system 104.

As shown in FIG. 3, at step 314, process 300 may include decrypting the (encrypted generalized) persona data. For example, advertisement network system 104 may decrypt the encrypted generalized persona data (e.g., a first ciphertext that includes the first encrypted generalized persona data) with a first private key of the advertisement network to form the generalized persona data (e.g., first generalized persona data). Additionally or alternatively, advertisement network system 104 may decrypt the encrypted session key (e.g., a first ciphertext that includes the encrypted session key) with the first private key of the advertisement network to form the session key.

In some non-limiting embodiments, if a ciphertext (e.g., first ciphertext) includes the (encrypted generalized) persona data and the (encrypted) session key, advertisement network system 104 may decrypt the ciphertext (e.g., first ciphertext) with a first private key of the advertisement network to form the generalized persona data (e.g., first generalized persona data) and the session key.

As shown in FIG. 3, at step 316, process 300 may include determining (e.g., generating, retrieving, and/or the like) at least one targeted advertisement based on the generalized persona data. For example, advertisement network system 104 may determine (e.g., generate, retrieve from advertisement database(s) 110, receive from advertiser system(s) 112, and/or the like) a targeted advertisement based on the generalized persona data (e.g., first generalized persona data).

In some non-limiting embodiments, advertisement network system 104 may generate a tracking token based on each respective targeted advertisement (e.g., first targeted advertisement). For example, advertisement network system 104 may randomly generate a nonce (e.g., a first nonce). Additionally or alternatively, the nonce may be generated based on any suitable generation and/or encryption technique. In some non-limiting embodiments, advertisement network system 104 may generate the tracking token based on each respective targeted advertisement (e.g., first targeted advertisement) and the respective nonce (e.g., first nonce), e.g., by a hash, combination, and/or the like of the respective targeted advertisement and the respective nonce.

In some non-limiting embodiments, advertisement network system 104 may sign (e.g., cryptographically sign and/or the like) the token, e.g., with the first private key of the advertisement network, to form a signed token.

As shown in FIG. 3, at step 318, process 300 may include encrypting the targeted advertisement. For example, advertisement network system 104 may encrypting the targeted advertisement (e.g., first targeted advertisement) with the session key to form an encrypted targeted advertisement (e.g., a first encrypted targeted advertisement).

In some non-limiting embodiments, encrypting the targeted advertisement (e.g., first targeted advertisement) may include advertisement network system 104 encrypting the targeted advertisement and the tracking token to form a second ciphertext. Additionally or alternatively, the second ciphertext may include the encrypted targeted advertisement (e.g., first encrypted targeted advertisement) and/or an encrypted tracking token.

As shown in FIG. 3, at step 320, process 300 may include communicating the (encrypted) targeted advertisement. For example, advertisement network system 104 may communicate the encrypted targeted advertisement (e.g., the first encrypted targeted advertisement) and the pseudo-identity data (e.g., the first pseudo-identity data) to mediator system 102.

In some non-limiting embodiments, communicating the encrypted targeted advertisement (e.g., first encrypted targeted advertisement) and the pseudo-identity data (e.g., first pseudo-identity data) to mediator system 102 may include advertisement network system 104 communicating the second ciphertext and the first pseudo-identity data to mediator system 102.

As shown in FIG. 3, at step 322, process 300 may include determining the user identity data. For example, mediator system 102 may determine the user identity data (e.g., the first user identity data) based on the pseudo-identity data (e.g., the first pseudo-identity data), e.g., received from advertiser network system 104. In some non-limiting embodiments, mediator system 102 may have stored a mapping of the respective user identity data (e.g., first use identity data) with the associated pseudo-identity data (e.g., first pseudo-identity data). Additionally or alternatively, mediator system 102 may determine the respective user identity data (e.g., first use identity data) by looking up the mapping based on the received pseudo-identity data (e.g., first pseudo-identity data).

As shown in FIG. 3, at step 324, process 300 may include communicating the (encrypted) targeted advertisement and/or the user identity data. For example, mediator system 102 may communicate the encrypted targeted advertisement (e.g., first encrypted targeted advertisement) and/or the respective user identity data (e.g., first user identity data) to the respective user device 106 (e.g., first user device 106), e.g., based on the respective user identity data (e.g., first user identity data).

In some non-limiting embodiments, communicating the encrypted targeted advertisement (e.g., first encrypted targeted advertisement) and/or the respective user identity data (e.g., first user identity data) to the respective user device 106 (e.g., first user device 106) may include communicating the second ciphertext and/or the respective user identity data (e.g., first user identity data) to the respective user device 106 (e.g., first user device 106).

In some non-limiting embodiments, the respective user device 106 (e.g., first user device 106) may receive the encrypted targeted advertisement (e.g., first encrypted targeted advertisement), which may be based on the first generalized persona data, from the advertisement network system 104 via the mediator system 102.

In some non-limiting embodiments, receiving the encrypted targeted advertisement (e.g., first encrypted targeted advertisement) at the respective user device 106 (e.g., first user device 106) may include receiving the second ciphertext at the respective user device 106 (e.g., first user device 106).

As shown in FIG. 3, at step 326, process 300 may include decrypting the first encrypted targeted advertisement. For example, user device(s) 106 (e.g., first user device 106) may decrypt the respective encrypted targeted advertisement (e.g., first encrypted targeted advertisement) with the session key to form the respective targeted advertisement (e.g., first targeted advertisement).

In some non-limiting embodiments, decrypting the encrypted targeted advertisement (e.g., first encrypted targeted advertisement) with the respective user device 106 (e.g., first user device 106) may include decrypting the second ciphertext with the respective user device 106 (e.g., first user device 106) to form the respective targeted advertisement (e.g., first encrypted targeted advertisement) and the tracking token.

As shown in FIG. 3, at step 328, process 300 may include communicating and/or presenting (e.g., displaying, playing, and/or the like) the targeted advertisement. For example, user device(s) 106 (e.g., first user device 106) and/or publisher system(s) 108 (e.g., a first publisher system 108) may communicate and/or present the targeted advertisement (e.g., first targeted advertisement) to the user.

In some non-limiting embodiments user device(s) 106 (e.g., first user device 106) may communicate the targeted advertisement (e.g., first targeted advertisement) and/or the tracking token (e.g., first tracking token) to publisher system(s) 108 (e.g., first publisher system 108). Additionally or alternatively, publisher system(s) 108 (e.g., first publisher system 108) may present the targeted advertisement (e.g., first targeted advertisement) to the user (e.g., directly and/or via user device(s) 106 (e.g., first user device 106)).

As shown in FIG. 3, at step 330, process 300 may include communicating the tracking token. For example, user device(s) 106 (e.g., first user device 106) and/or publisher system(s) 108 (e.g., a first publisher system 108) may communicate and/or present the targeted advertisement (e.g., first targeted advertisement) to the user.

In some non-limiting embodiments user device(s) 106 (e.g., first user device 106) may communicate the targeted advertisement (e.g., first targeted advertisement) and/or the tracking token (e.g., first tracking token) to publisher system(s) 108 (e.g., first publisher system 108). In some non-limiting embodiments, publisher system(s) 108 (e.g., first publisher system 108) may communicate the tracking token (e.g., first tracking token) to mediator system 102. Additionally or alternatively, mediator system 102 may communicate the tracking token (e.g., first tracking token) to advertisement network system 104.

As shown in FIG. 3, at step 332, process 300 may include billing and/or payment, e.g., based on the tracking token. For example, advertisement network system 104 may determine that the targeted advertisement (e.g., first targeted advertisement) was presented (e.g., to the first user) based on the tracking token. In some non-limiting embodiments, payment (e.g., a monetary amount, a rewards amount, and/or the like) may be distributed (e.g., transmitted, transferred, and/or the like) to at least one of mediator system 102, publisher system(s) 108, user device(s) 106, and/or the like (e.g., from advertisement network system 104, advertiser system(s) 112, and/or the like).

Figure 4:
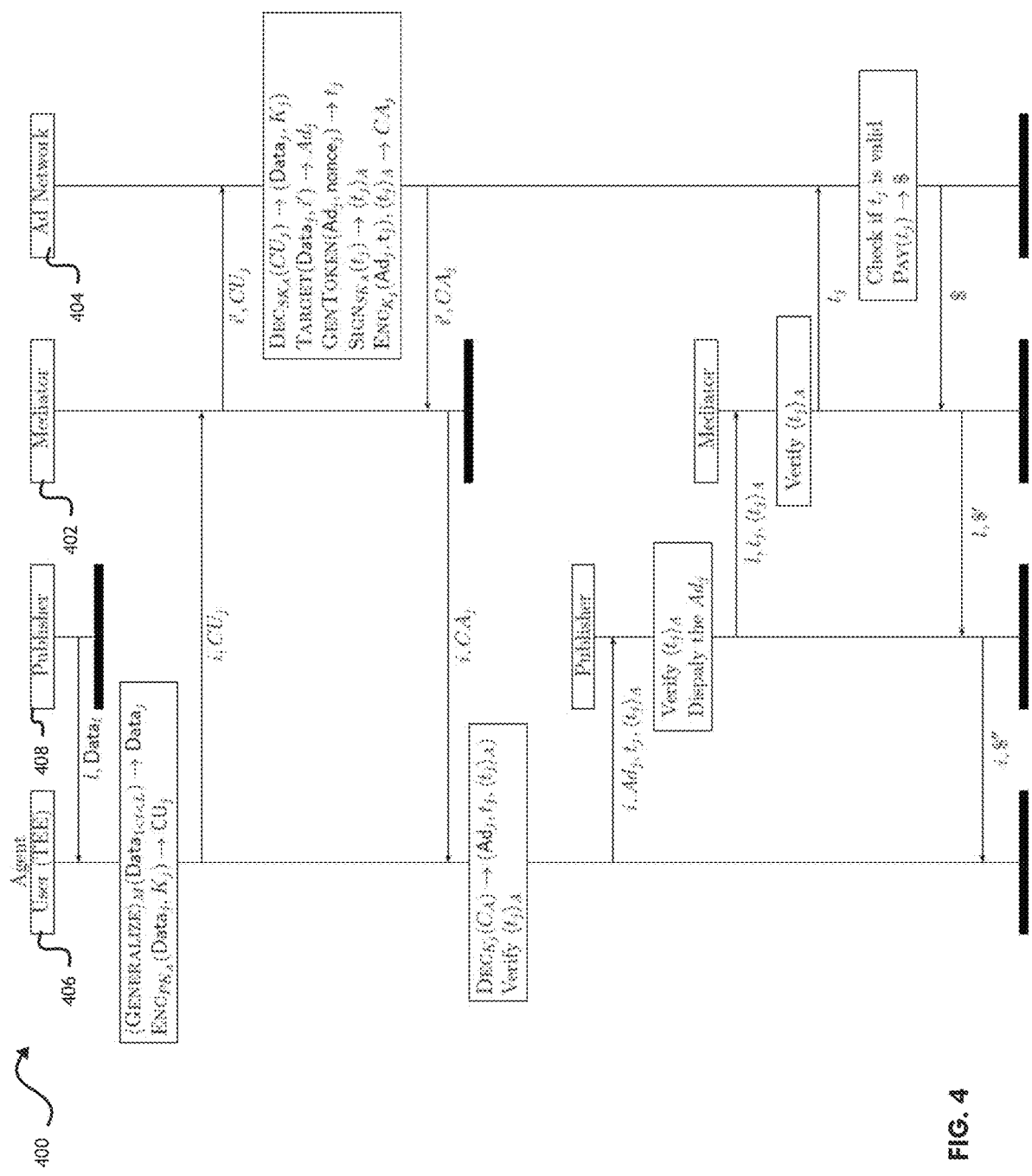
FIG. 4 is a swimlane diagram of a non-limiting embodiment of an implementation of a non-limiting embodiment of the process shown in FIG. 3, according to the principles of the presently disclosed subject matter.

Referring to FIG. 4, FIG. 4 is a swimlane diagram of an exemplary implementation 400 of a non-limiting embodiment relating to process 300 shown in FIG. 3. As shown in FIG. 4, implementation 400 may include mediator system 402, advertisement network system 404, user device(s) 406, and/or publisher system(s) 408. In some non-limiting embodiments, mediator system 402 may be the same as, similar to, or part of mediator system 102 (e.g., one or more devices of mediator system 102). In some non-limiting embodiments, advertisement network system 404 may be the same as, similar to, or part of advertisement network system 104 (e.g., one or more devices of advertisement network system 104). In some non-limiting embodiments, user device(s) 406 may be the same as, similar to, or part of user device(s) 106 (e.g., one or more of user device(s) 106). In some non-limiting embodiments, publisher system(s) 408 may be the same as, similar to, or part of publisher system(s) 108 (e.g., one or more devices of publisher system(s) 108).

In some non-limiting embodiments, user device(s) 406 may include (e.g., store and execute and/or the like) a local agent (e.g., an agent application and/or the like), e.g., to monitor the local environment and/or publisher system(s) 408 and/or communicate over networks (e.g., the Internet and/or the like). Additionally or alternatively, user device(s) 406 may include at least one device capable of running a trusted execution environment (TEE) (e.g., a smartphone and/or the like), e.g., to execute the local agent. In some non-limiting embodiments, the local agent may to aggregate user data (e.g., associated with at least a portion of persona data and/or the like) from publisher system(s) 408 (e.g., different IoT devices and/or the like) and/or services (e.g., running on at least one of publisher system(s) 408, user device 406, and/or the like) and/or may generate a unifying view of the user data (e.g., persona data including a vector of attributes and/or the like). Additionally or alternatively, the local agent may assist with management of user identity (e.g., user identity data and/or the like) and/or communications. Additionally or alternatively, user device(s) 406 may assure that the user identity data is not made available to advertisement network system 404, as described herein.

In some non-limiting embodiments, the user data (e.g., persona data and/or generalized persona data) intended for sharing with advertisement network system 404 (e.g., for targeted advertising and/or the like), may be shared (e.g., communicated and/or the like) via mediator system 102 (e.g., an honest-but-curious mediator), e.g., in a manner that satisfies desired and/or selected security and/or privacy properties. For example, mediator system 402 may be able to view (e.g., receive in plain text, clear text and/or the like) only the user identity (e.g., user identity data and/or the like). Additionally or alternatively, mediator system 402 may receive an encryption of user data (e.g., encrypted generalized persona data and/or a ciphertext containing the same), but may not receive and/or view the user data (e.g., in plain text, clear text and/or the like). In some non-limiting embodiments, mediator system 402 may assist in persona generalization, anonymous billing, and/or the like, as described herein. For example, mediator system 402 may compute (e.g., in collaboration with user device(s) 406, without such collaboration, and/or the like) a generalized persona function (e.g., Generate( ) and/or the like), e.g., based on encrypted user data (e.g., encrypted persona data and/or the like) using homomorphic encryption so that the local agent may decide (e.g., automatically, selectively, and/or the like) the level for generalization (e.g., coarseness and/or the like) of the raw user data (e.g., persona data). Additionally or alternatively, mediator system 402 may track delivery (e.g., communication, presentation, and/or the like) of targeted advertisements, e.g., for accounting, payment, billing, and/or the like using a verifiable one-time token (e.g., tracking token from advertisement network system 404 and/or the like), as described herein. In some non-limiting embodiments, the token (e.g., tracking token and/or the like) may flow (e.g., be communicated and/or the like) to and/or from users (e.g., user devices 406), publishers (e.g., publisher system(s) 408), mediator system 402, advertisement network system 404, and/or the like. Additionally or alternatively, payment (e.g., based on the tracking token) may flow (e.g., be transferred and/or the like) to and/or from advertisement network system 404, mediator system 402, publishers (e.g., publisher system(s) 408), users (e.g., user devices 406), and/or the like (e.g., the reverse route of communication of the tracking token). In some non-limiting embodiments, the accounting/billing/payment process may happen in a less frequent manner, e.g., once a month and/or the like, compared to the targeted advertisement delivery.

In some non-limiting embodiments, communications may be encrypted, e.g., using a semantically secure encryption scheme so that no attacks on integrity or confidentiality of the communications may be feasible. The encryption may include any suitable encryption technique, e.g., an encryption technique in which the desired security properties are achieved. In some non-limiting embodiments, notation such as $\text{Enc}_{PK}(m)$ may denote a ciphertext corresponding to message m, encrypted using the public key PK. Additionally or alternatively, $\text{Dec}_{sk}(m)$ may denote the decryption of (encrypted) message m using the secret key sk. Additionally or alternatively, the public key and private key for entity i may be denoted as $pk_i$ and $sk_i$, respectively. In some non-limiting embodiments, at least some and/or part of communications may be signed by the sender, e.g., to allow for authentication. The signature may include any suitable digital signature technique, e.g., a technique that guarantees protection against forgery. In some non-limiting embodiments, notation such as $<m>_s$ may denote that the message m is signed by secret key sk.

In some non-limiting embodiments, persona generalization may include a technique that may allow different users to have different secret keys corresponding to a common public key such that, when the messages encrypted corresponding to these secret keys are combined together, it is possible to obtain the encrypted form for the sum of these messages, which can be decoded using a secret key that is also the sum of the secret keys of the messages involved. For example, one such technique may be referred to as a linear key homomorphic encryption scheme, an additive homomorphic encryption scheme, and/or the like. In some non-limiting embodiments, a Paillier cryptosystem may be a suitable example of such an encryption scheme and/or may allow anonymization and/or generalization of user personas efficiently.

In some non-limiting embodiments, a local agent may include a program (e.g., application and/or the like) that may run on a user's local trusted execution environment (e.g., TEE of user device(s) 406 and/or the like). Additionally or alternatively, the local agent may coordinate sensitive data management and network communication. In some non-limiting embodiments, the sensitive data may include keys for encryption, user identity data, non-identifiable user data (e.g., persona data, generalized persona data, and/or the like), tokens (e.g., tracking tokens, payment tokens, and/or the like), and/or the like. In some non-limiting embodiments, to protect such sensitive data, the local agent may run in a TEE. Additionally or alternatively, such sensitive data may be revealed in plaintext only in the TEE, and the data in the storage (e.g., hard disk, flash memory, and/or the like) may be encrypted with a secret key generated in the TEE. For example, a smartphone may include an encrypted enclave for sensitive data.

When a user wants to join, the user may start by verifying its TEE (e.g., of the respective user device 406) and initializing a local agent therein. Additionally or alternatively, upon initialization, the local agent may build secure connection channels with publisher system(s) 408 (e.g., IoT devices, web sites/services, mobile applications, and/or the like), e.g., that are associated with the user. Additionally or alternatively, the channels may allow the local agent to aggregate data from different publishers (e.g., associated with publisher system(s) 408) and build initial (e.g., raw) persona data, e.g., a vector of attributes, with user identity data omitted. In some non-limiting embodiments, the agent may determine the generalization function, e.g., by having at least one communication with mediator system 402 on the encrypted raw persona data. Additionally or alternatively, the agent may display the raw persona, the generalization functions (e.g., buckets/hierarchical categorizations that assure each attribute is hidden among threshold many users), and/or the like in a graphical user interface (e.g., privacy dashboard and/or the like). In some non-limiting embodiments, the user may choose generalization functions (e.g., buckets/hierarchical categorizations), whether to share certain attributes, and/or the like, e.g., based on the user's preference(s). Additionally or alternatively, the user may go online (e.g., open, log into, and/or the like the agent application) anytime. Additionally or alternatively, the agent may handle the communications described herein automatically. For example, the user may occasionally check in the agent to update privacy selections/preferences, collect rewards (e.g., promotions, payments, discount offers, and/or the like) from publishers (e.g., associated with publisher system(s)

408) based on the user's contributions (e.g., targeted advertisements communicated/presented to the user, e.g., by user device 406, publisher system(s) 408, and/or the like).

In some non-limiting embodiments, the agent may generate a one-time session key $K_j$ and/or encrypts the generalized persona data and/or session key with a public key $pk_A$ of advertisement network system 404. Additionally or alternatively, using mediator system 402 as a proxy, the agent may send the ciphertext $CU_j$ to advertisement network system 404, which may compute and encrypt the targeted advertisement $Ad_j$ with a one-time token $t_j$ (which may also be signed as $<t_j>_A$) with $K_j$ to form a second ciphertext $CA_j$, which may be sent back to the agent using the same route (e.g., via mediator system 402). Additionally or alternatively, the agent may then decrypt the second ciphertext, verifies the signed token, and/or communicate/present the targeted advertisement. Additionally or alternatively, the agent may communicated the targeted advertisement and/or the token to the appropriate (e.g., designated and/or the like) publisher system 408 for presentation (e.g., display and/or the like).

In some non-limiting embodiments, a one-time setup (e.g., registration and/or the like) may be performed for each new user (e.g., user device 406 thereof) that wishes to participate. For example, the setup (e.g., registration and/or the like) may include distributing keys (e.g., public and/or private keys, as described herein) for secure communication, establishing authorization credentials for the user, and/or the like. In some non-limiting embodiments, a trusted certification authority (e.g., reputable certificate authorities like Symantec, DigiCert, GlobalSign, and/or the like) may carry out at least a portion of the setup (e.g., key generation and distribution and/or the like). Additionally or alternatively, based on the number of users registered, such a trusted authority may also help with data anonymization (e.g., as decryption server 514c, as described herein). In some non-limiting embodiments, the trusted authority may be contacted only once per new user, and therefore involvement of such trusted authority may be limited.

In some non-limiting embodiments, users may be rewarded for their role. Additionally or alternatively, sybil identities (e.g., fake identities imitating real users) may be prevented (e.g., eliminated, reduced, detected, and/or the like). For example, sybil identities may be detectable by the trusted authority only registering users (e.g., user devices 406 thereof) that can prove that they run a TEE (e.g., Intel-SGX enabled devices and/or the like).

In some non-limiting embodiments, user device(s) 406 may receive persona data ($Data_I$) and publisher identity data (I) from publisher system(s) 408, as described herein. Additionally or alternatively, user device(s) 406 may generalize the persona data ($Data_I$) to from generalized persona data for the session ($Data_j$). Additionally or alternatively, user device(s) 406 may encrypt the generalized persona data for the session ($Data_j$) and a session key ($K_j$) with a public key of advertisement network system 404 for form a ciphertext from the user for the session ($CU_j$), as described herein.

Figure 5A:
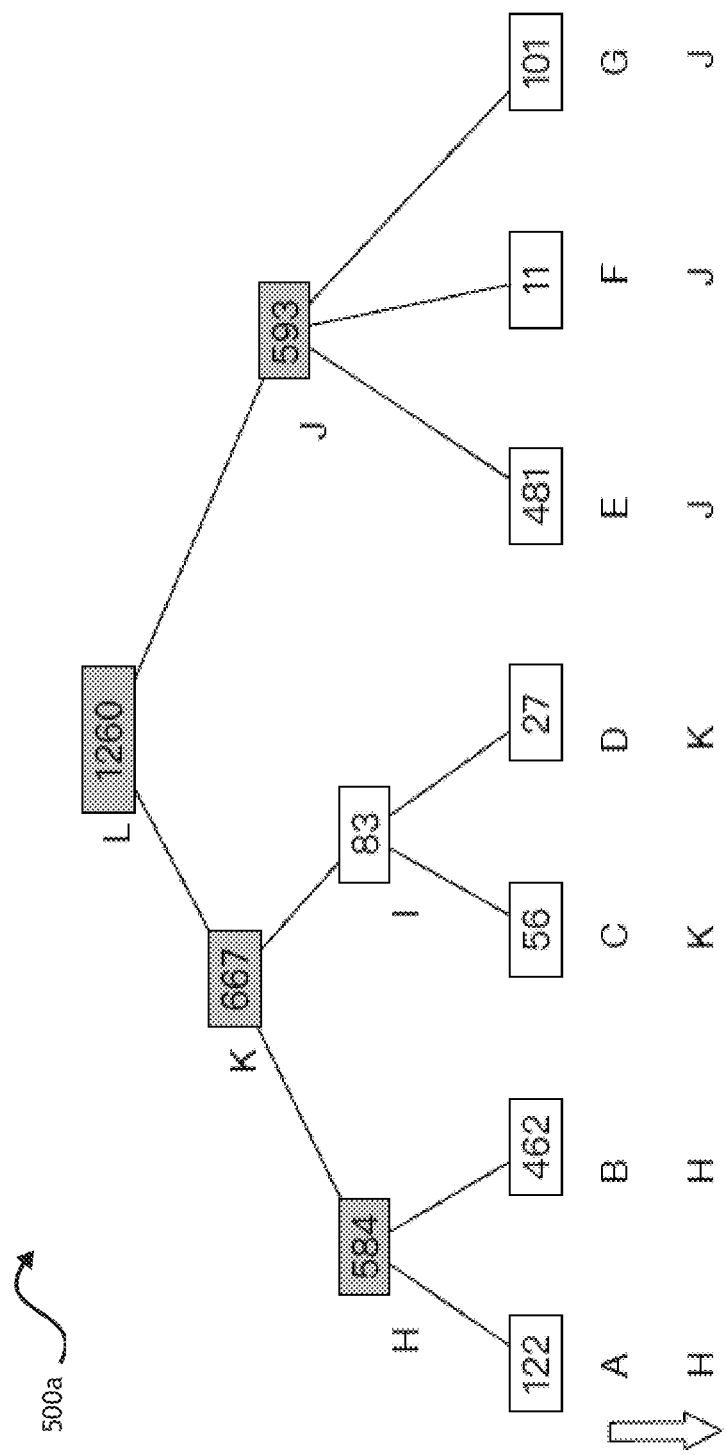
FIGS. 5A-5C are diagrams of non-limiting embodiments implementations of a non-limiting embodiment of the process shown in FIG. 3, according to the principles of the presently disclosed subject matter.

Referring now to FIG. 5A, FIG. 5A is a diagram of an exemplary tree (e.g., hierarchical tree) according to an implementation 500a of a non-limiting embodiment relating to process 300 shown in FIG. 3. With continued reference to FIG. 4, in some non-limiting embodiments or aspects, implementation 500a may be implemented (e.g., completely, partially, and/or the like) by user device(s) 406 and/or mediator system 402 (e.g., one or more devices of mediator system 402). In some non-limiting embodiments or aspects, implementation 500a may be implemented (e.g., completely, partially, and/or the like) by another system, another device, another group of systems, or another group of devices, separate from or including user device(s) 406 and/or mediator system 402, such as advertisement network system 404 (e.g., one or more devices of advertisement network system 404), publisher system(s) 408 (e.g., one or more devices of publisher system(s) 408), advertisement database 410, advertiser system(s) 412 (e.g., one or more devices of advertiser system(s) 412), and/or the like.

In some non-limiting embodiments, mediator system 402 may break the correlation between user identity data and other user data (e.g., persona data and/or the like). For example, it may be undesirable for user identity data to be available to advertisement network system 404 (e.g., which may exploit user identity data, in contravention of privacy concerns). In some non-limiting embodiments, the user data (e.g., persona data) may be sent to advertisement network system 404 in a format that may have a low possibility of uniquely identifying the user (e.g., generalized format, such as generalized persona data). For example, a user may be indistinguishable from N other similar users. In some non-limiting embodiments, persona data may include a vector of attributes, and each attribute may have a limited set of possible values (e.g., initial buckets and/or the like). Additionally or alternatively, for each attribute, the bucket description may be generalized (e.g., coarsened and/or the like), e.g., to ensure there are at least θ users in the bucket. For example, if the attribute age has a value 21, the value may be generalized into a coarser bucket (e.g., age 20-30), assuring more than θ number of users belong to this age bucket. In some non-limiting embodiments, an exemplary technique for determining such generalized buckets may be referred to as an Attribute Rebucketing Algorithm (ARA). Additionally or alternatively, the ARA may include collaboration with a centralized environment (e.g., mediator system 402).

In some non-limiting embodiments, for each attribute, there may be more than one categorization for the value (e.g., hierarchical categorizations). For example, a user's age may be referred to as 21, between 20 and 30, between 0 and 50, and/or the like. Additionally or alternatively, a user's location may be described by a zip code (e.g., 94306), a city name (e.g., Palo Alto), a region name (e.g., Bay Area), a state name (e.g., California), a country name (e.g., US), a planet name (e.g., Earth) and/or the like. In some non-limiting embodiments, the hierarchy of categorization may form a tree structure. For example, the leaves (e.g., leaf nodes of the tree) may include the fine-grained (e.g., finest-grained, raw, and/or the like) values. Additionally or alternatively, each parent (e.g., non-leaf node) at each level may include a categorization that is more coarse-grained. In some non-limiting embodiments, advertisement network system 404 and/or mediator system 402 may agree on the hierarchy of categorization for each attribute in advance (e.g., pre-defined categorizations, preselected categorizations, and/or the like). For example, such agreement may be beneficial for transparency and public auditing.

In some non-limiting embodiments, user data (e.g., persona data including a vector of attributes with corresponding attribute values) for each user, before any generalization, may include attribute values associated with the leaves (e.g., leaf nodes) of the tree. For example, such fine-grained attribute values may potentially be used by a receiver (e.g., advertisement network system 404 and/or the like) to uniquely identify the user. In some non-limiting embodiments, the attribute values may be replaced with higher-level (e.g., coarse-grained) categorizations (e.g., buckets), e.g., from non-leaf nodes above the leaf node. For example, the ARA may include a threshold θ such that the determined bucket for each attribute may have more than the threshold θ number of users therein. In some non-limiting embodiments, attribute values may be coarsened by moving up the levels in the tree structure until a non-leaf node (e.g., associated with a bucket/categorization) is identified in which a total count of users at the node exceeds the threshold.

For the purpose of illustration, referring to FIG. 5A, assume that a given attribute initially has seven buckets, which may be referred to as A through G. (In some non-limiting embodiments, the following algorithm (ARA) may apply to each attribute of persona data (e.g., in series, in parallel, and/or the like), and may be applied for any possible number of initial buckets/leaf nodes). In some non-limiting embodiments, a tree structure may be generated with leaf nodes for each initial bucket (e.g., A through G). For the purpose of illustration, assume the threshold θ for this attribute is 500. As shown in FIG. 5A, the aggregate count of hypothetical users in each of the initial buckets A through G may be [122, 462, 56, 27, 481, 11, 101], respectively (e.g., 122 users have an attributed value associated with bucket A, 462 users have an attributed value associated with bucket B, and so on). In some non-limiting embodiments, ARA may proceed as follows:
1. For each non-leaf node, compute the value to be equal to the sum of its children: e.g., val(H)=val(A)+val(B).
2. Invalidate the nodes whose values are lower than θ (e.g., trim the tree).
3. For each leaf node, traverse up to its ancestors until the first valid node is identified, which is assigned as the determined bucket, e.g., A→H, B→H, C→K, D→K, E→J, F→J, and G→J.

In some non-limiting embodiments, as shown in FIG. 5A, the mapping relation at the end of the algorithm may be {A,B→H; C,D→K; E,F,G→J}. In some non-limiting embodiments, ARA may run in time linear in the number of total nodes of the tree. Additionally or alternatively, given the trimmed tree, there might be multiple ancestors to which a leaf node may be mapped. For example, leaf node A may choose to map to its valid ancestors H or K. In some non-limiting embodiments, since both nodes contain sufficiently many users (e.g., privacy preserving), a user with an attribute value associated with leaf node A may select to report the categorization for either of these non-leaf nodes H or K for that user's generalized persona data. Additionally or alternatively, personalization (e.g., targeted advertisements and/or the like) may be more accurate if the direct ancestor (e.g., non-leaf node H) is reported instead of the further ancestor (e.g., non-leaf node K). In some non-limiting embodiments, ARA may reveal to the users what (initial) buckets had fewer (or more) than the threshold number of users belonging thereto. Additionally or alternatively, the actual counts remain hidden, e.g., to provide further privacy.

In some non-limiting embodiments, the choice of threshold θ may be impactful in ensuring privacy for the registered users. For example, the threshold θ may be set sufficiently high for the users to be sufficiently indistinguishable. Additionally or alternatively, if the threshold θ is set too high, over-generalization may be possible and/or may result in reduced personalization (e.g., reduced accuracy in generation of targeted advertisements by advertisement network system 404 and/or the like). In some non-limiting embodiments, advertisement network system 404 may recommend a threshold value θ (e.g., to mediator system 402, the trusted authority, and/or the like). For example, the recommended threshold may be a value beyond which personalization may not be guaranteed. In some non-limiting embodiments, when a new user registers, the new user may be informed (e.g., by mediator system 402, the trusted authority, and/or the like) of the recommended threshold. Additionally or alternatively, the use may select (e.g., via user device 406 and/or the like) whether to conform the recommended threshold or select a different threshold value. For example, if the user is satisfied with the recommendation provided by advertisement network system 404 (e.g., via the agent on user device 406), registration may proceed. Additionally or alternatively, if the user selects (e.g., via the agent on user device 406) a higher threshold (e.g., the user feels the current recommendation is too low, prefers greater privacy, does not trust advertisement network system 404, and/or the like), then user device 406, mediator system 402, and/or the trusted authority may ensure that buckets generated for the user conform to the user-specified threshold. In some non-limiting embodiments, a reduction in the reward paid to the user (e.g., as a fee for sharing the generalized persona and/or receiving the targeted advertisement) may correspond to a high threshold θ (e.g., a more generalized persona). In some non-limiting embodiments, advertisement network system 404 may receive some information about the threshold picked by the user (e.g., the level of generalization may be apparent from and/or inferred from the generalized persona data and/or the like), and/or advertisement network system 404 may better understand the privacy preferences of its user(s) based thereon.

In some non-limiting embodiments, the ARA may give an N-anonymity guarantee for each attribute. Additionally or alternatively, when users share more than one attribute (e.g., the persona data includes a vector with more than one attribute), the upper bound of the most anonymity level is the minimum of the threshold levels of all attributes of the vector (e.g., $Min(\theta_1, \theta_2, \ldots \theta_v)$, where $\theta_i$ is the threshold for attribute i in a vector with v attributes). In some non-limiting embodiments, for simplicity, attributes may be assumed to be independent from each other. Additionally or alternatively, it may be likely that a user with some number of attributes may be actually unique. In some non-limiting embodiments, to address such a possibility, a clustering algorithm may be run on per-attribute N-anonymized personas to converge orphan personas. Such clustering may assure (e.g., with acceptably high probability) that the each cluster may contain more than T users. Additionally or alternatively, users in the same cluster may be very alike (e.g., share many attributes, generalized attributes, and/or the like).

In some non-limiting embodiments, clustering may be performed with access to the plain text data (e.g., persona data). For example, after ARA, each attribute may be N-anonymized. Additionally or alternatively, each user can send that user's N-anonymized persona data (e.g., vector of attributes with N-anonymized attribute values) to a trusted decryption server (e.g., of mediator system 402, the trusted authority, and/or the like). Additionally or alternatively, such a trusted decryption server may also have access to each user's unique (e.g., raw) persona, and such access may be tolerable because the trusted decryption server may not know which user the unique persona maps to (e.g., may not have access to the user identity data), so the possibility of the trusted decryption server identifying the user may be 1/M, where M is total number of users in the system. In some non-limiting embodiments, clustering may include the following (e.g., by the trusted decryption server):

1. Rank each persona by number of users in descending order, and select the top M/T personas to be the centroid.
2. For each user, compute the distance to each centroid, find the closest one, and assign that user to the cluster with the closest centroid.
3. For each cluster, compute the new centroids using majority vote. Compute the size of the cluster (e.g., number of users in the cluster).
4. For the cluster whose size is less than T, compute the distance of the centroid to other clusters' centroids, find the closest other cluster, and merge the cluster and the closest other cluster.
5. Repeat step 4 until all clusters have more than T users.
6. For each user of each cluster, compute the mapping relation to the centroid.

In some non-limiting embodiments, the number of attributes may be extremely large if exhausting all possible attributes at once. Additionally or alternatively, step 1 may result in uniformly sized clusters of one persona each, and clustering from top personas may be difficult, not be useful, and/or the like. In some non-limiting embodiments, a subset of attributes may be agreed upon (e.g., by the advertisement network system 404, mediator system 402, and/or the like). For example, the subsets may be non-overlapping, or, if overlapping, the attributes are may be dependent. Additionally or alternatively, clusters may be produced in step 1 for each subset.

In some non-limiting embodiments, clustering may be performed without access to the plain text data (e.g., persona data), e.g., clustering may be performed using encrypted data (e.g., persona data). For example, secret sharing may be used to decrypt a given persona (e.g., a persona with a subset of attributes with given attribute values/categories) when a sufficient number of shares of such persona are available. In some non-limiting embodiments, each user may have a share of a given persona, and when there is enough shares sent to the decryption server, the decryption server may be able to recover the given persona. Exemplary implementations are further discussed below with relation to FIGS. 5B and 5C.

Figure 5B:
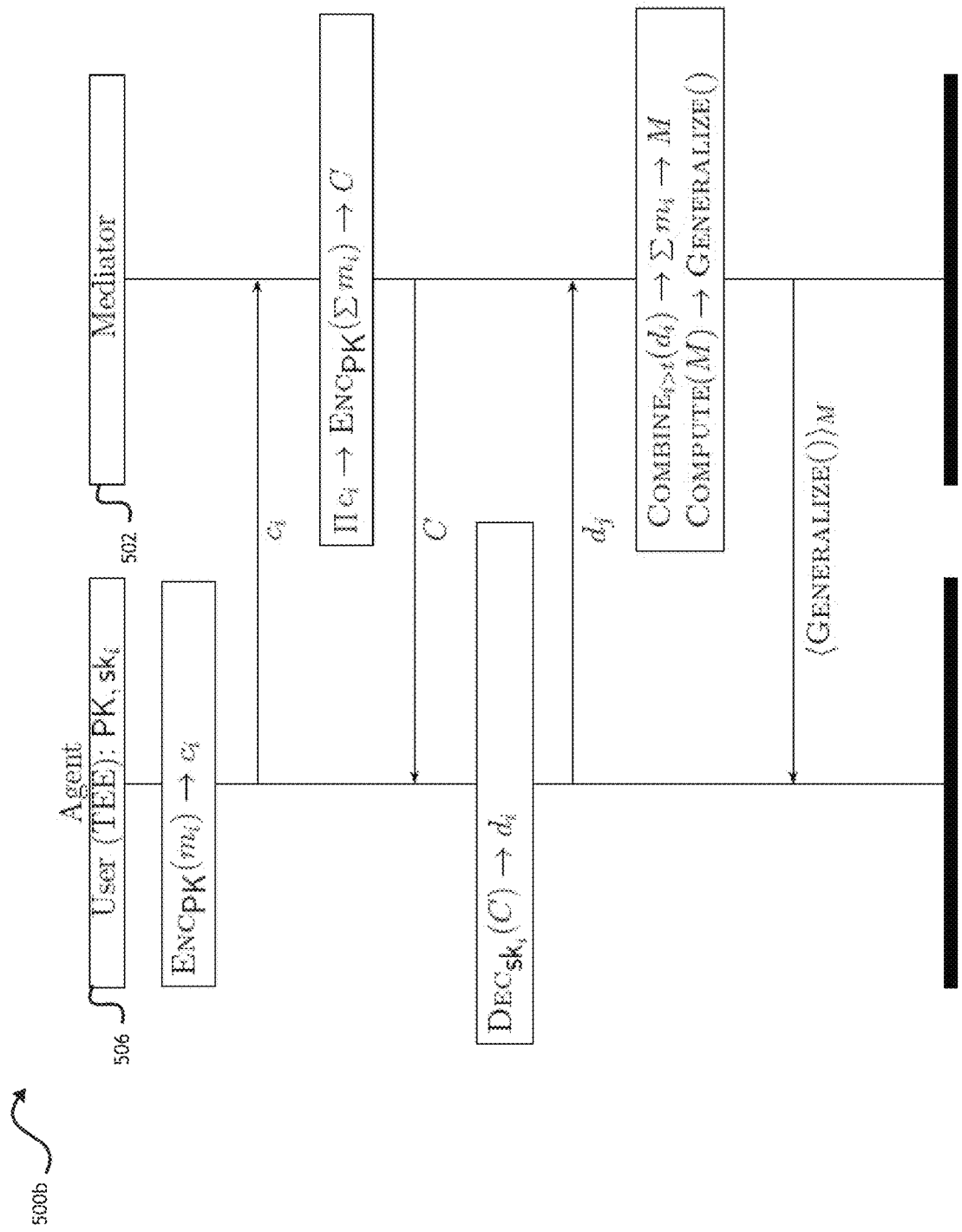

Referring now to FIG. 5B, FIG. 5B is a swimlane diagram of an exemplary implementation $500b$ of a non-limiting embodiment relating to process 300 shown in FIG. 3. As shown in FIG. 5B, implementation $500b$ may include mediator system 502 and/or user device(s) 506. In some non-limiting embodiments, mediator system 502 may be the same as, similar to, or part of mediator system 102, mediator system 402, and/or the like. In some non-limiting embodiments, user device(s) 506 may be the same as, similar to, or part of user device(s) 106, user device(s) 406, and/or the like.

In some non-limiting embodiments, ARA may use (e.g., count, determine, obtain, and/or the like) the exact number of users in each initial bucket. In some non-limiting embodiments, each user may communicate the initial (e.g., raw) value for each attribute of such user's persona to a central point (e.g., mediator system 502) for counting. Additionally or alternatively, such communication may reveal the user data (e.g., persona data) to the central point (e.g., mediator system 502), and/or such revealing may allow the central point to stump advertisement network system 404. In some non-limiting embodiments, this revealing may be prevented by interactively (e.g., collaboratively) clustering with mediator system 502 and user devices 506 using encrypted user data (e.g., persona data), as described herein.

In some non-limiting embodiments, users (e.g., user device 506) may generate the generalized personas (e.g., with limited, reduced, or eliminated participation by mediator system 502), e.g., user-centric counting. For example, each user device 506 may have a key $k_i$, and a key $K=\Sigma_i k_i$. Additionally or alternatively, user i (e.g., user device 506 thereof) may compute an encrypted message $Enc_{k_i}(m_i)$ corresponding to the attribute value, and the encrypted message may be communicated to mediator system 502. Additionally or alternatively, mediator system 502 may combine all the encrypted messages to obtain $Enc_{\Sigma_i k_i}(\Sigma_i m_i)$, e.g., using a linear-key homomorphic scheme (e.g., under the Decisional Diffie Hellman (DDH) assumption, the ElGamal encryption scheme may be suitable). In some non-limiting embodiments, mediator system 502 may communicate $Enc_{\Sigma_i k_i}(\Sigma_i m_i)$ to the user devices 506, which may have (e.g., collectively and/or the like) the key $K=\Sigma_i k_i$ to decrypt $Enc_{\Sigma_i k_i}(\Sigma_i m_i)$. Additionally or alternatively, each respective user device 506 may compute the buckets associated with the respective user device 506 based on this aggregate information. Additionally or alternatively, each user device 506 may provide (e.g., communicate) to mediator system 502 the generalized persona based on such buckets (e.g., encrypted using the public key of advertisement network system 404 to produce encrypted generalized persona data, as described herein). For example, mediator system 502 may be unable to learn the individual personas that the users (e.g., user device 506 thereof) share with advertisement network system 404. In some non-limiting embodiments, user-centric counting may become increasingly expensive for computation when the number of users increases and may require all the user device 506 to be online at the time the aggregate information is being computed by mediator system 502. Additionally or alternatively, the amount of data communicated from the Mediator to the user may increase because aggregate information may be being communicated. Additionally or alternatively, each user (e.g., user device 506 thereof) may learn the counts for all the buckets, so although the user device 506 does not have access to user identify data of individual users that contact mediator system 502, each user device 506 may have access to the full demographics of such users. Additionally or alternatively, key distribution may be difficult, e.g., as new users join and/or existing users discontinue participation.

In some non-limiting embodiments, mediator system 502 may have an increased role, e.g., collaborating with users (e.g., user devices 506 thereof) to generate the generalized personas, e.g., mediator-centric counting. For example, mediator-centric counting may solve the challenges of high bandwidth, key distribution, and users joining/leaving. In some non-limiting embodiments, mediator-centric counting may include four rounds of communication (e.g., between each user device 506 and mediator system 502) and/or may provide (e.g., guarantee and/or the like) comparable performance to user-centric counting by replacing expensive key-homomorphic schemes with faster secret sharing and additive homomorphic schemes (e.g., Paillier encryption). In some non-limiting embodiments, mediator-centric counting may obviate sending relatively large aggregate data to each user device 506 (which may result in high bandwidth and/or privacy concerns, as described herein). In some non-limiting embodiments, each user device 506 may have (e.g., store, receive, and/or the like) a public key pk and a share of the corresponding secret key $sk_i$. Additionally or alternatively, a threshold number of these secret keys may collectively be used to decrypt any message encrypted using public key pk, but decryption may not be possible with less than the threshold number of secret keys. In some non-limiting embodiments, after the initial setup phase, the following four rounds of communication may occur to establish the (generalized) personas:

1. Each user device 506 may send an encrypted message $Enc_{pk}(m_i)$ associated with the respective attribute value for the respective user device 506 to mediator system 502.
2. Mediator system 502 may combine these encrypted messages using an additive homomorphic scheme to obtain a combined message $C=Enc_{pk}(\Sigma_i m_i)$. This combined message C may be communicated by mediator system 502 to all user devices 506.
3. Each user device 506 may use its share of the secret key $sk_i$ to decrypt the combined message C and obtains share of the combined message $s_i=Dec_{sk_i}(C)$. Each user device 506 may communicate its share of the combined message to mediator system 502.
4. Mediator system 502 may receive the share of the combined message $s_i$ from a threshold number of user devices 506 to obtain the sum of the messages $\Sigma_i m_i$. The aggregate information ($\Sigma_i m_i$) may be used to create the buckets, e.g., using the ARA described herein (e.g., which now may have the property that each bucket has at least threshold many users). (In some non-limiting embodiments, an option for the user to select what threshold the user wants may be added. Additionally or alternatively, mediator system 502 may create the buckets based on such selection. Such selectable thresholds may result in a cost of added computation for mediator system 502, which may re-bucket multiple times (e.g. up to once for each user), but such selectable thresholds have the benefit of increased personalization. Additionally or alternatively, such selectable thresholds may allow each user to control how much privacy such user is comfortable with/desires.) Additionally or alternatively, mediator system 502 may send information about the determined buckets (e.g., the Generalize( ) function) to the user devices 506.
5. Each user device 506 may determine (e.g., calculate and/or the like) a generalized persona based on the determined buckets (e.g., the Generalize( ) function). Additionally or alternatively, each user device 506 may sends the associated generalized persona data to mediator system 502, as described herein (e.g., after encrypting the generalized persona data with the public key of advertisement network system 404 to form encrypted generalized persona data). Additionally or alternatively, mediator system 502 may forward the (encrypted generalized persona) to advertisement network system 404, as described herein (e.g., after replacing the user identity data with associated pseudo-identity data).

In some non-limiting embodiments, users may join and/or discontinue participation at different times. Additionally or alternatively, to avoid redistribution of keys after each new user joins or each existing user leaves (e.g., discontinued participation), the trusted authority may initially create a pool of shares of the private key $sk_i$ and distributes such shares of the private key $sk_i$ as and when new users join. Additionally or alternatively, the number of such shares of the private key $sk_i$ may depend on the frequency at which the system is desired to run (e.g., can afford to run and/or the like) a full redistribution for the keys (e.g., shares of the secret key $sk_i$), the storage constraints of the trusted authority, and/or the like.

Figure 5C:
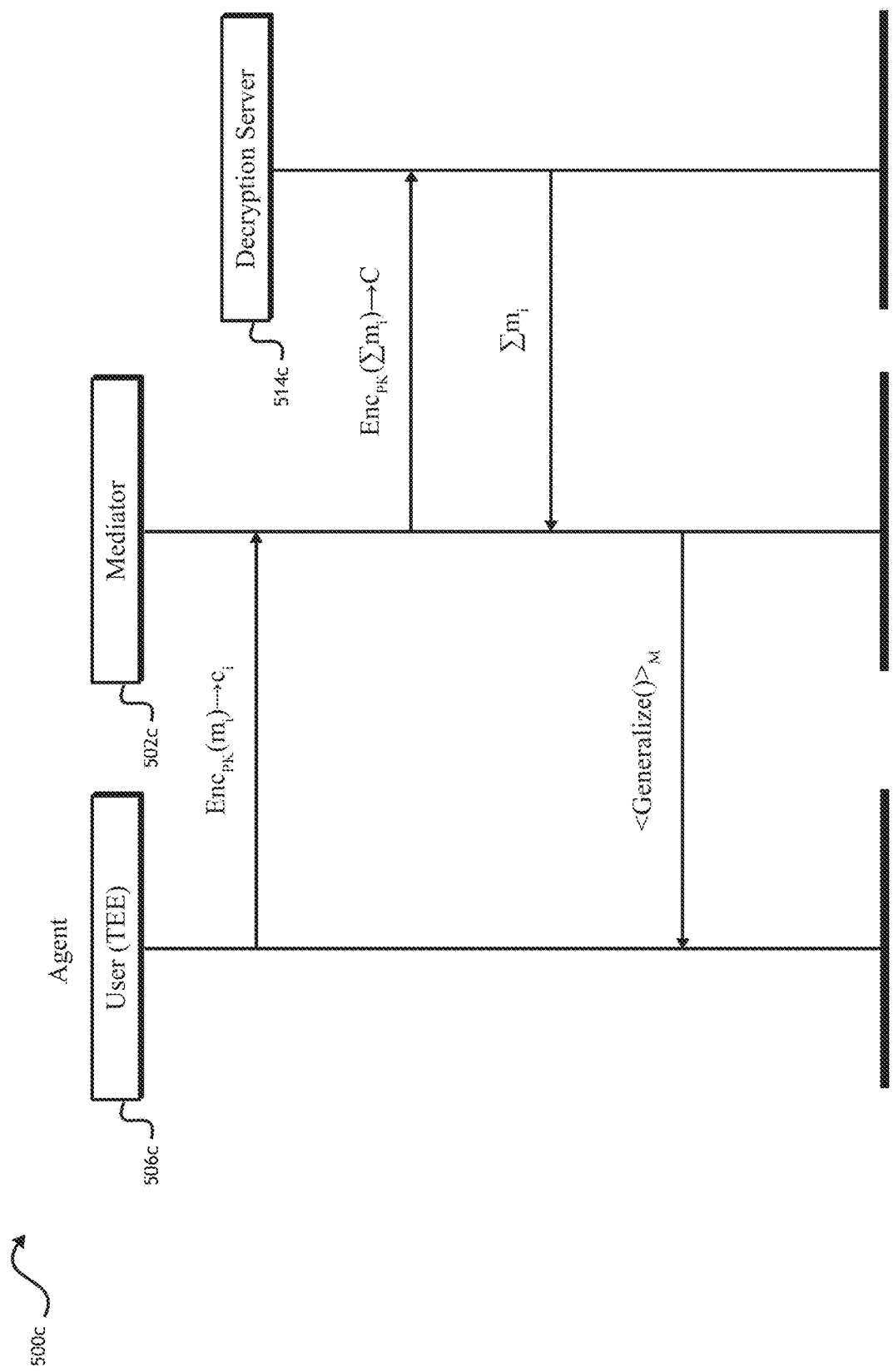

Referring now to FIG. 5C, FIG. 5C is a swimlane diagram of an exemplary implementation 500c of a non-limiting embodiment relating to process 300 shown in FIG. 3. As shown in FIG. 5C, implementation 500c may include mediator system 502c, user device(s) 506c, and decryption server 514c. In some non-limiting embodiments, mediator system 502c may be the same as, similar to, or part of mediator system 102, mediator system 402, mediator system 502, and/or the like. In some non-limiting embodiments, user device(s) 506c may be the same as, similar to, or part of user device(s) 106, user device(s) 406, user device(s) 506, and/or the like. In some non-limiting embodiments, decryption server 514c may be the same as, similar to, or part of trusted decryption server described above with respect to FIG. 4 (e.g., a trusted authority and/or the like).

In some non-limiting embodiments, users (e.g., user device 506) and mediator system 502c may generate the generalized personas with limited participation by a decryption server 514c, e.g., decryption server-centric counting. For example, a first exemplary decryption server-centric counting algorithm may include the following:

1. Each user device 506c may send an encrypted message $Enc_{pk}(m_i)$ associated with the respective attribute value for the respective user device 506c to mediator system 502c.
2. Mediator system 502c may combine these encrypted messages using an additive homomorphic scheme to obtain a combined message $C=Enc_{pk}(\Sigma_i m_i)$. This combined message C may be communicated by mediator system 502c to decryption server 514c.
3. Decryption server 514c may use its secret key sk to decrypt the combined message C and obtain the sum of the messages $\Sigma_i m_i$. The aggregate information ($\Sigma_i m_i$) may be communicated to mediator system 502c.
4. Mediator system 502c may use the aggregate information ($\Sigma_i m_i$) to create the buckets, e.g., using the ARA described herein (e.g., which now may have the property that each bucket has at least threshold many users). Additionally or alternatively, mediator system 502c may send information about the determined buckets (e.g., the Generalize( ) function) to the user devices 506c.
5. Each user device 506c may determine (e.g., calculate and/or the like) a generalized persona based on the determined buckets (e.g., the Generalize( ) function).

In some non-limiting embodiments, a benefit of the first exemplary decryption server-centric counting algorithm may include that such algorithm may not include communicating combined message C to at least threshold many users, and, instead, combined message C is communicated one time from mediator system 502c to decryption server 514c. Additionally or alternatively, if desired, each user device 506c may communicate an ephemeral decryption permission to the decryption server 514c (e.g., to rate limit the decryption query from mediator system 502). Additionally or alternatively, mediator system 502 may decrypt one individual message or one aggregation message.

For example, a second exemplary decryption server-centric counting algorithm may include the following:
1. Each user device 506c may send a ciphertext including an encryption of a message $m_i$ and a random number $r_i$ (e.g., $Enc_{pk}(m_i+r_i)$) to mediator system 502c, and the message may be associated with the respective attribute value for the respective user device 506c.
2. Mediator system 502c may combine these encrypted messages using an additive homomorphic scheme to obtain a combined message $C=Enc_{pk}(\Sigma_i(m_i+r_i))$. This combined message C may be communicated by mediator system 502c to decryption server 514c.
3. Decryption server 514c may use its secret key sk to decrypt the combined message C and obtain the sum of the messages and random numbers ($\Sigma_i(m_i+r_i)$). The sum of random numbers ($\Sigma_{r_i}$) may be subtracted from the sum of the messages and random numbers ($\Sigma_i(m_i+r_i)$) to obtain the sum of the messages ($\Sigma_i m_i$). The aggregate information ($\Sigma_i m_i$) may be communicated to mediator system 502c.

4. Mediator system 502c may use the aggregate information ($\Sigma_i m_i$) to create the buckets, e.g., using the ARA described herein (e.g., which now may have the property that each bucket has at least threshold many users). Additionally or alternatively, mediator system 502c may send information about the determined buckets (e.g., the Generalize( ) function) to the user devices 506c.

5. Each user device 506c may determine (e.g., calculate and/or the like) a generalized persona based on the determined buckets (e.g., the Generalize( ) function).

In some non-limiting embodiments, a benefit of the second exemplary decryption server-centric counting algorithm may include defense against a malicious mediator system 502c.

Referring again to FIG. 4, mediator system 402 may anonymize communications from user device(s) 406 to advertisement network system 404, e.g., without preventing advertisement network system 404 from personalizing targeted advertisements for the user(s) of user device(s) 406. For example, to balance personalization/accuracy of the targeted advertisement with use privacy/anonymity, advertisement network system 404 may be able to correlate sufficient information to generate the best (e.g., most accurate) targeted advertisement possible for the user without learning the identity of the user (e.g., user identity data and/or the like). In some non-limiting embodiments, mediator system 402 may maintain (e.g., for each session and/or the like) a mapping that hides the user's real identity (e.g., user identity data) from advertisement network system 404, which may observes packets coming from some user i' (e.g., pseudo-identity data of the user) and not the real user i (e.g., user identity data). In some non-limiting embodiments, mediator system 402 may convert i to i', as described herein. Additionally or alternatively, the mapping from i to i' may be maintained (e.g., remain constant and/or the like) throughout at least one session (e.g., session j). Additionally or alternatively, the mapping may be changed when user i changes generalized persona data (as described herein), when user i (e.g., via user device 406) requests that mediator system 402 change the mapping, and/or the like. In some non-limiting embodiments, mediator system 402 may not learn anything more than the fact that user i changed from one persona to another, and/or other entities (e.g., advertisement network system 404 and/or the like) may be unaware of the change in persona and/or change in mapping. In some non-limiting embodiments, the mapping may be changed (e.g., refreshed, regenerated, and/or the like) per user's request to prevent any off-line analytics, e.g., by advertisement network system 404 and/or the like (e.g., for any user i with pseudo-identity data i', the advertisement network system 404 may be unable to obtain any information about i from knowledge of i' or any other pseudo-identities of other users in this session).

In some non-limiting embodiments, mediator system 402 may replace user identity data (i) with pseudo-identity data (i'), as described herein. Additionally or alternatively, mediator system 402 may communicate the pseudo-identity data (i') and the ciphertext from the user for the session ($CU_j$) to advertisement network system 404, as described herein. In some non-limiting embodiments, advertisement network system 404 may decrypt the ciphertext from the user for the session ($CU_j$) to form the generalized persona data for the session ($Data_j$) and the session key ($K_j$). Additionally or alternatively, advertisement network system 404 may determine a targeted advertisement ($Ad_j$) based on the generalized persona data for the session ($Data_j$) and/or the pseudo-identity data (i'), as described herein. Additionally or alternatively, advertisement network system 404 may generate a tracking token ($t_j$) based on the targeted advertisement ($Ad_j$) and a nonce, as described herein. Additionally or alternatively, advertisement network system 404 may sign the tracking token ($t_j$) to form a signed tracking token ($<t_j>_A$), as described herein. Additionally or alternatively, advertisement network system 404 may encrypt the targeted advertisement ($Ad_j$) and the token ($t_j$), which may be combined with the signed token ($<t_j>_A$) to for a ciphertext from the advertisement network for the session ($CA_j$), as described herein. Additionally or alternatively, advertisement network system 404 may communicate the ciphertext from the advertisement network for the session ($CA_j$) and the pseudo-identity data (i') to mediator system 402, as described herein. Additionally or alternatively, mediator system 402 may communicate the ciphertext from the advertisement network for the session ($CA_j$) and the user identity data (i) to user device 406, as described herein.

Additionally or alternatively, all entities (e.g., user device(s) 406, publisher system(s) 408, mediator system 402, and/or the like) may be incentivized (e.g., receive payment, rewards, and/or the like) for participation. In some non-limiting embodiments, the incentive amount (e.g., payment, reward, and/or the like) may be decided based on the number of targeted advertisements being presented to the user(s). For example, a way to track such communication/presentation of targeted advertising in a privacy-preserving manner may be to include a one-time token (e.g., tracking token and/or the like) with the targeted advertisement, as described herein. In some non-limiting embodiments, this token (e.g., tracking token and/or the like) may be used to tally the number of targeted advertisements that were communicated, presented, and/or the like, and tracking of these tokens (e.g., tracking token and/or the like) may prevent false claims (e.g., about the size of the user base, the number of targeted advertisements presented to user(s), and/or the like). In some non-limiting embodiments, advertisement network system 404 may generate such a token (e.g., tracking token and/or the like) for each targeted advertisement network system 404 determines and/or communicates (e.g., to mediator system 402 and/or the like) for presentation to a user. Additionally or alternatively, advertisement network system 404 may use a randomly generated nonce to generate the token, e.g., to prevent forgery of tokens. (For example, publisher system 408 and/or mediator system 502 may not be able to claim more users and/or targeted advertisement presentations than what advertisement network system 404 provides since the use of nonce may enforce non-repudiation of the same token for multiple users.) In some non-limiting embodiments, when user device 406 receives a targeted advertisement, user device 406 may also receive the corresponding token (e.g., tracking token and/or the like). Additionally or alternatively, user device 406 may communicate the token (e.g., to advertisement network system 404 directly or indirectly via publisher system(s) 408 and/or mediator system 402), as described herein. In some non-limiting embodiments, since the user (e.g., user device 406 thereof) may be unaware of the nonce that was used to generate the token, and, as such, the user may be unable to forge the token and/or fake reception of a targeted advertisement to advertisement network system 404. Additionally or alternatively, neither publisher system 408 nor mediator system 402 may forge the token and/or fake communication/presentation of a targeted advertisement since neither publisher system 408 nor mediator system 402 knows the nonce that was used to generate the token.

In some non-limiting embodiments, once advertisement network system 404 receives the token (e.g., tracking token and/or the like), e.g., from user device 406 (e.g., directly or indirectly via publisher system(s) 408 and/or mediator system 402), advertisement network system 404 may determine a precise count of how many targeted advertisements were displayed, how many users are registered with each publisher system 408, how many users are registered with mediator system 402, and/or the like. Additionally or alternatively, such counts may be used to allocate incentives (e.g., payments, rewards, and/or the like) fairly, e.g., based on the budget of advertisement network system 404.

In some non-limiting embodiments, user device 406 may communicate to publisher system 408 (e.g., first publisher system 408) at least one of the user's user identity data i, the targeted advertisement $Ad_j$, the tracking token $t_j$, the signed tracking token $<t_j>_A$ (e.g., as signed by advertisement network system 404, as described herein), any combination thereof, and/or the like. Additionally or alternatively, user may be presented with the targeted advertisement, e.g., by at least one publisher system 408 (e.g., first publisher system 408 with publisher identity data I), either directly or indirectly via user device 406. In some non-limiting embodiments, publisher system 408 (e.g., first publisher system 408) may verify the signed tracking token $<t_j>_A$ (e.g., using any suitable digital signature technique, which may include a public key of advertisement network system 404). Additionally or alternatively, publisher system 408 may communicate to mediator system 402 at least one of the publisher identity data I, the tracking token $t_j$, the signed tracking token $<t_j>_A$, any combination thereof, and/or the like. In some non-limiting embodiments, mediator system 402 may verify the signed tracking token $<t_j>_A$ (e.g., using any suitable digital signature technique, which may include a public key of advertisement network system 404). Additionally or alternatively, mediator system 402 may communicate to advertisement network system 404 the tracking token $t_j$. In some non-limiting embodiments, advertisement network system 404 may determine whether tracking token $t_j$ is valid. Additionally or alternatively, may distribute a first incentive (e.g., first payment amount $) to mediator system 402. In some non-limiting embodiments, mediator system 402 may distribute a second incentive (e.g., second payment amount $') to the respective publisher system 408 (e.g., to first publisher system 408 based on publisher identity data I). Additionally or alternatively, the second incentive (e.g., second payment amount $') may be less than the first incentive (e.g., first payment amount $). In some non-limiting embodiments, the respective publisher system 408 (e.g., to first publisher system 408) may distribute a third incentive (e.g., third payment amount $") to the respective user device 406 (e.g., to first user device 406 based on user identity data i). Additionally or alternatively, the third incentive (e.g., third payment amount $") may be less than the second incentive (e.g., second payment amount $').

In some non-limiting embodiments, the number of buckets in a given attribute (e.g., as produced by ARA) may be referred to as b, the total number of users may be referred to as M, the threshold for each attribute may be referred to as θ. Additionally or alternatively, the most information any entity (e.g., curious, malicious, and/or the like) may gain is that a given bucket (or collection thereof) contains either less than or at least threshold θ many users in it. Additionally or alternatively, for the finest (e.g., most informative) such bucket, if the number of users in such bucket is determined to be less than the threshold θ, the likelihood that the bucket contains exactly k users may be given by the following formula (for k<θ):

$$\binom{M}{k} / \sum_{i=0}^{\theta-1} \binom{M}{i}$$

In some non-limiting embodiments, most likely guess here (e.g., value of k that maximizes this probability) may be k=θ/2. Additionally or alternatively, at worst each user becomes indistinguishable from θ/2 other users. Additionally or alternatively, out of a total of M users, there may be $$\binom{M}{\theta/2}$$

set of θ/2 users. Additionally or alternatively, the likelihood that a particular user will be identified may be exponentially low in θ (e.g., given that θ can belong to any of these sets/attributes). Additionally or alternatively, this probability may be very low for even moderate values of θ on a large user base.

In some non-limiting embodiments, when the finest bucket contains at least threshold θ many users, the privacy guarantee may be at least as much as the aforementioned situation since each user may be indistinguishable from at least θ other users. In some non-limiting embodiments, given that the total number of buckets b in all the attributes may be much smaller than an exponential in the threshold θ, a union bound may show that, with high probability, ARA may ensures that a single user may be indistinguishable from many others that register.

In some non-limiting embodiments, advertisement network system 404 may receive only pseudo-identity data (i'), ciphertext from the user for the session ($CU_j$), and tracking token ($t_j$) as inputs during the entire session (j). Additionally or alternatively, pseudo-identity data (i') may not leak (e.g., expose, allow advertisement network system 404 to infer, and/or the like) user identity data (i) because the mapping of user identity data (i) to pseudo-identity data (i') (e.g., i→i') generated by mediator system 402 may be computed randomly for each session (j). Additionally or alternatively, advertisement network 404 may not the user's data across different sessions to infer the user's identity, since the pseudo-identity data (i') may be randomly generated for each session (j). In some non-limiting embodiments, ciphertext from the user for the session ($CU_j$) may include an encryption of the user's generalized persona data, the session key, and/or the like, as described herein. Additionally or alternatively, the session identifier (j) may be independent of user identity data (i), so knowledge of the session identifier (j) may not leak (e.g., expose, allow advertisement network system 404 to infer, and/or the like) user identity data (i). Additionally or alternatively, since the persona data is generalized (e.g., sufficiently privacy-preserving/identity hiding), advertisement network system 404 is unable to learn any information about user identity data (i) from the ciphertext ($CU_j$).

In some non-limiting embodiments, the targeted advertisements may be hidden from mediator system 402 (e.g., to prevent mediator system 402 from impersonating advertisement network system 404 and/or the like). For example, none of pseudo-identity data (i'), ciphertext from advertisement network for the session (CA_j), publisher identity data, and/or tracking token $t_j$ leaks (e.g., exposes, allow mediator system 402 to infer, and/or the like) the targeted advertisement to mediator system 402.

In some non-limiting embodiments, malicious users may be prevented from learning user identity data of other users by sending fake persona information. For example, as described herein, even the finest bucket will only reveal user identities with a probability that is exponentially low in the threshold θ selected for the ARA. Additionally or alternatively, the maximum information revealed to the malicious users is whether the number of non-malicious users belonging to any given bucket (or collection thereof) is lower or higher than the threshold θ. Additionally or alternatively, even in a worst case scenario in which the number of malicious users t=θ−2, when these malicious users determine that a bucket contains θ−1 users, the single non-malicious user in this bucket could have been anyone among the M−θ+2 users, which may be a large number of users. In some non-limiting embodiments, malicious users may be prevented from receiving an incentive (e.g., directly or indirectly from the advertisement network system 404) by faking communication/presentation of targeted advertisements. For example, since advertisement network system 404 issues incentives only when a valid token is received, the malicious users may not be able to locally generate a valid token without decrypting the advertisement and/or reusing previously obtained tokens, since the nonce used by advertisement network system 404 to generate valid tokens may be unknown to the users and may not be retrieved otherwise.

Figure 6:
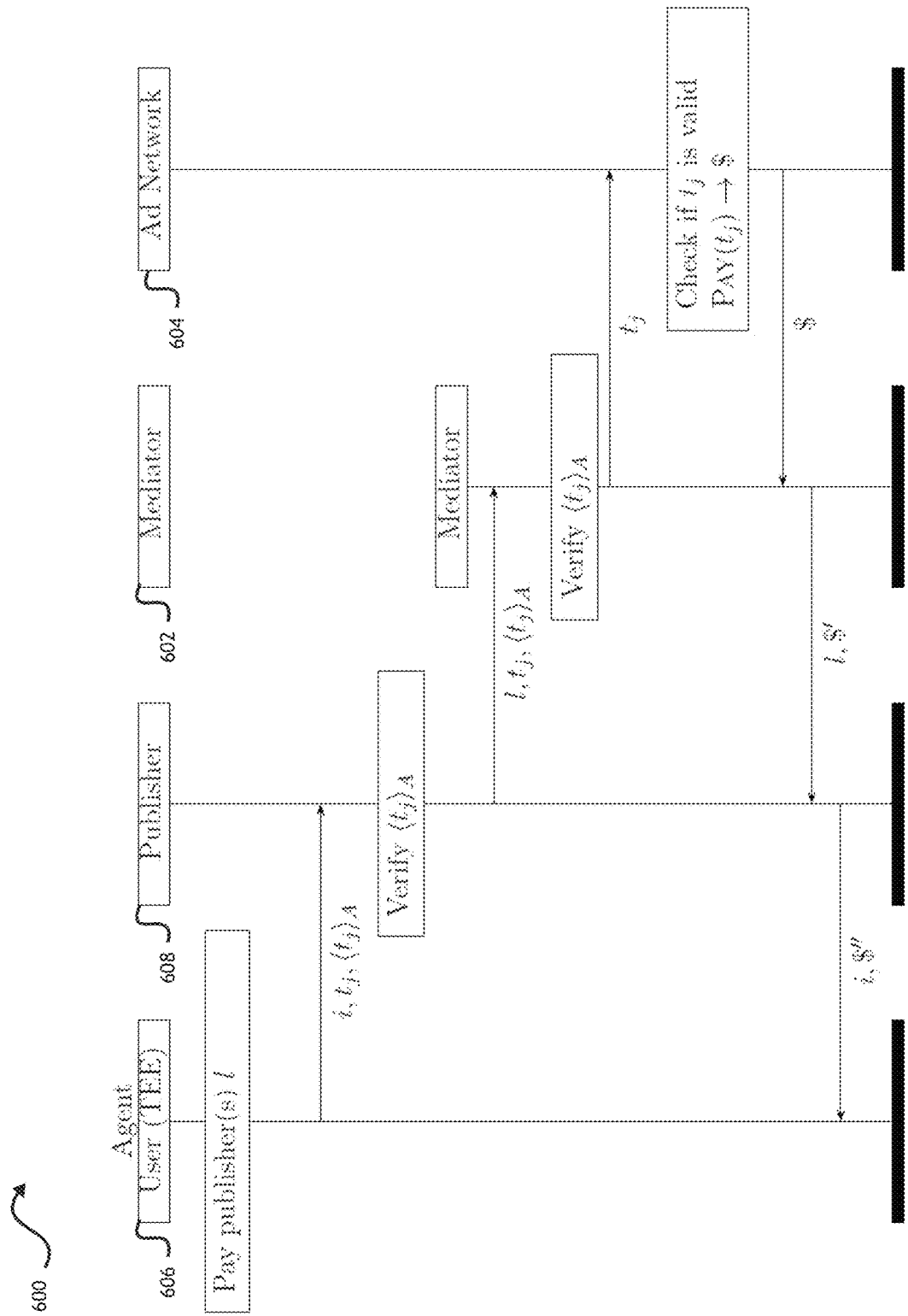
FIG. 6 is a swimlane diagram of a non-limiting embodiment of an implementation of a non-limiting embodiment of the process shown in FIG. 3, according to the principles of the presently disclosed subject matter.

Referring now to FIG. 6, FIG. 6 is a swimlane diagram of an exemplary implementation 600 of a non-limiting embodiment relating to process 300 shown in FIG. 3. As shown in FIG. 6, implementation 600 may include mediator system 602, advertisement network system 604, user device(s) 606, and/or publisher system(s) 608. In some non-limiting embodiments, mediator system 602 may be the same as, similar to, or part of mediator system 102, mediator system 402, mediator system 502, mediator system 502c, and/or the like. In some non-limiting embodiments, advertisement network system 604 may be the same as, similar to, or part of advertisement network system 104, advertisement network system 404, and/or the like. In some non-limiting embodiments, user device(s) 606 may be the same as, similar to, or part of user device(s) 106, user device(s) 406, user device(s) 506, and/or user device(s). In some non-limiting embodiments, publisher system(s) 608 may be the same as, similar to, or part of publisher system(s) 108, publisher system(s) 408, and/or the like.

In some non-limiting embodiments, user (e.g., via user device 606) may pay at least one publisher system 608 (e.g., first publisher system 408 with publisher identity data I), e.g., based on the targeted advertisement (e.g., complete a payment transaction redeeming the benefit of an offer presented in the targeted advertisement). Additionally or alternatively, user device 606 may communicate to publisher system 408 (e.g., first publisher system 608) at least one of the user's user identity data i, the tracking token the signed tracking token $<t_j>_A$ (e.g., as signed by advertisement network system 604, as described herein), any combination thereof, and/or the like.

In some non-limiting embodiments, publisher system 608 (e.g., first publisher system 608) may verify the signed tracking token $<t_j>_A$ (e.g., using any suitable digital signature technique, which may include a public key of advertisement network system 604). Additionally or alternatively, publisher system 608 may communicate to mediator system 602 at least one of the publisher identity data I, the tracking token the signed tracking token $<t_j>_A$, any combination thereof, and/or the like.

In some non-limiting embodiments, mediator system 602 may verify the signed tracking token $<t_j>_A$ (e.g., using any suitable digital signature technique, which may include a public key of advertisement network system 604). Additionally or alternatively, mediator system 602 may communicate to advertisement network system 604 the tracking token $t_j$.

In some non-limiting embodiments, advertisement network system 604 may determine whether tracking token $t_j$ is valid. Additionally or alternatively, may distribute a first incentive (e.g., first payment amount $) to mediator system 602. In some non-limiting embodiments, mediator system 602 may distribute a second incentive (e.g., second payment amount $') to the respective publisher system 608 (e.g., to first publisher system 608 based on publisher identity data I). Additionally or alternatively, the second incentive (e.g., second payment amount $') may be less than the first incentive (e.g., first payment amount $). In some non-limiting embodiments, the respective publisher system 608 (e.g., to first publisher system 608) may distribute a third incentive (e.g., third payment amount $") to the respective user device 606 (e.g., to first user device 406 based on user identity data i). Additionally or alternatively, the third incentive (e.g., third payment amount $") may be less than the second incentive (e.g., second payment amount $').

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A method, comprising:
   receiving, with a first user device, first persona data associated with a first user from at least one publisher system;
   generalizing, with the first user device, the first persona data to form first generalized persona data;
   generating, with the first user device, a session key;
   encrypting, with the first user device, the first generalized persona data and the session key with a first public key of an advertisement network system to form a first ciphertext;
   communicating, with the first user device, the first ciphertext and first user identity data to a mediator system, the first user identity data associated with an identity of the first user;
   receiving, with the first user device, a first encrypted targeted advertisement based on the first generalized persona data from the advertisement network system via the mediator system; and
   decrypting, with the first user device, the first encrypted targeted advertisement with the session key to form a first targeted advertisement,
   wherein the first persona data comprises a first vector, wherein a plurality of users comprises the first user, wherein each respective user of the plurality of users is associated with respective persona data comprising a respective vector, wherein each respective vector comprises a plurality of respective attributes, wherein generalizing the first persona data comprises:

for each respective attribute of the plurality of respective attributes:
  generating a tree comprising a plurality of leaf nodes and a plurality of non-leaf nodes, each leaf node associated with at least one possible value of the respective attribute, each non-leaf node associated with a hierarchical category associated with at least two leaf nodes;
  counting a number of users of the plurality of users having a respective attribute value for the respective attribute associated with the at least one possible value of each leaf node; and
  for each respective non-leaf node, determining a sum of the number of users for all leaf nodes under the respective non-leaf node; and for each respective attribute of the first vector:
  determining whether the number of users of the plurality of users having the respective attribute value for the respective attribute associated with the at least one possible value of a respective leaf node exceeds a threshold; and
  in response to determining that the number of users exceeds the threshold, retaining the respective attribute value for the respective attribute, and, in response to determining that the number of users does not exceed the threshold, replacing the respective attribute value for the respective attribute with the hierarchical category associated with a first non-leaf node for which the sum exceeds the threshold above the respective leaf node.

2. The method of claim 1, wherein a plurality of user devices comprises a respective user device for each respective user of the plurality of users, wherein counting the number of users comprises:

for each respective attribute of the plurality of respective attributes:
  encrypting, with each respective user device, the respective attribute value of the respective attribute with a second public key to form an encrypted respective attribute value, wherein each respective user device comprises a respective share of a private key associated with the second public key;
  transmitting, with each respective user device, a message comprising the encrypted respective attribute value to the mediator system;
  combining, by the mediator system, the messages from each respective user device with additive homomorphic encryption to form a combined message;
  transmitting, by the mediator system, the combined message to each respective user device;
  decrypting, with each respective user device, a share of the combined message using the respective share of the private key of the respective user device;
  transmitting, with each respective user device, the share of the combined message to the mediator system; and
  combining, with the mediator system, the shares of the combined message from each respective user device to form a sum of the messages, wherein the number of users is based on the sum of the messages.

3. The method of claim 1, further comprising:
generating, with the mediator system, first pseudo-identity data associated with the first user identity data; and
communicating, with the mediator system, the first ciphertext and the first pseudo-identity data to the advertisement network system.

4. The method of claim 3, further comprising:
decrypting, with the advertisement network system, the first ciphertext with a first private key of the advertisement network system to form the first generalized persona data and the session key;
determining, with the advertisement network system, the first targeted advertisement based on the first generalized persona data;
encrypting, with the advertisement network system, the first targeted advertisement with the session key to form the first encrypted targeted advertisement; and
communicating, with the advertisement network system, the first encrypted targeted advertisement and the first pseudo-identity data to the mediator system.

5. The method of claim 4, further comprising:
determining, with the mediator system, the first user identity data based on the first pseudo-identity data; and
communicating, with the mediator system, the first encrypted targeted advertisement to the first user device based on the first user identity data.

6. The method of claim 4, further comprising:
generating, with the advertisement network system, a tracking token based on the first targeted advertisement,
wherein encrypting the first targeted advertisement comprises encrypting the first targeted advertisement and the tracking token to form a second ciphertext, the second ciphertext comprising the first encrypted targeted advertisement,
wherein communicating the first encrypted targeted advertisement and the first pseudo-identity data to the mediator system comprises communicating the second ciphertext and the first pseudo-identity data to the mediator system,
wherein receiving the first encrypted targeted advertisement comprises receiving the second ciphertext, and
wherein decrypting the first encrypted targeted advertisement comprises decrypting the second ciphertext to form the first targeted advertisement and the tracking token.

7. The method of claim 6, wherein the at least one publisher system comprises a first publisher system, the method further comprising:
communicating, with the first user device, the first targeted advertisement and the tracking token to the first publisher system;
presenting, with the first publisher system, the first targeted advertisement to the first user;
communicating, with the first publisher system, the tracking token to the mediator system; and
communicating, with the mediator system, the tracking token to the advertisement network system.

8. A system, comprising:
a first user device configured to:
  receive first persona data associated with a first user from at least one publisher system;
  generalize the first persona data to form first generalized persona data;
  generate a session key;
  encrypt the first generalized persona data and the session key with a first public key of an advertisement network system to form a first ciphertext;

communicate the first ciphertext and first user identity data to a mediator system, the first user identity data associated with an identity of the first user;

receive a first encrypted targeted advertisement based on the first generalized persona data from the advertisement network system via the mediator system; and decrypt the first encrypted targeted advertisement with the session key to form a first targeted advertisement, wherein the first persona data comprises a first vector, wherein a plurality of users comprises the first user, wherein each respective user of the plurality of users is associated with respective persona data comprising a respective vector, wherein each respective vector comprises a plurality of respective attributes, wherein generalizing the first persona data comprises:

the mediator system being configured to, for each respective attribute of the plurality of respective attributes:

generate a tree comprising a plurality of leaf nodes and a plurality of non-leaf nodes, each leaf node associated with at least one possible value of the respective attribute, each non-leaf node associated with a hierarchical category associated with at least two leaf nodes;

count a number of users of the plurality of users having a respective attribute value for the respective attribute associated with the at least one possible value of each leaf node; and for each respective non-leaf node, determine a sum of the number of users for all leaf nodes under the respective non-leaf node; and the first user device being configured to, for each respective attribute of the first vector:

determine whether the number of users of the plurality of users having the respective attribute value for the respective attribute associated with the at least one possible value of a respective leaf node exceeds a threshold; and in response to determining that the number of users exceeds the threshold, retain the respective attribute value for the respective attribute, and, in response to determining that the number of users does not exceed the threshold, replace the respective attribute value for the respective attribute with the hierarchical category associated with a first non-leaf node for which the sum exceeds the threshold above the respective leaf node.

9. The system of claim 8, wherein a plurality of user devices comprises a respective user device for each respective user of the plurality of users, wherein counting the number of users comprises, for each respective attribute of the plurality of respective attributes:

each respective user device being configured to encrypt the respective attribute value of the respective attribute with a second public key to form an encrypted respective attribute value, wherein each respective user device comprises a respective share of a private key associated with the second public key;

each respective user device being configured to transmit a message comprising the encrypted respective attribute value to the mediator system;

the mediator system being configured to combine the messages from each respective user device with additive homomorphic encryption to form a combined message;

the mediator system being configured to transmit the combined message to each respective user device;

each respective user device being configured to decrypt a share of the combined message using the respective share of the private key of the respective user device;

each respective user device being configured to transmit the share of the combined message to the mediator system; and the mediator system being configured to combine the shares of the combined message from each respective user device to form a sum of the messages, wherein the number of users is based on the sum of the messages.

10. The system of claim 8, wherein the mediator system is configured to:

generate first pseudo-identity data associated with the first user identity data; and communicate the first ciphertext and the first pseudo-identity data to the advertisement network system.

11. The system of claim 10, wherein the advertisement network system is configured to:

decrypt the first ciphertext with a first private key of the advertisement network system to form the first generalized persona data and the session key;

determine the first targeted advertisement based on the first generalized persona data;

encrypt the first targeted advertisement with the session key to form the first encrypted targeted advertisement; and communicate the first encrypted targeted advertisement and the first pseudo-identity data to the mediator system.

12. The system of claim 11, wherein the mediator system is configured to:

determine the first user identity data based on the first pseudo-identity data; and communicate the first encrypted targeted advertisement to the first user device based on the first user identity data.

13. The system of claim 11, wherein the advertisement network system is configured to:

generate a tracking token based on the first targeted advertisement, wherein encrypting the first targeted advertisement comprises encrypting the first targeted advertisement and the tracking token to form a second ciphertext, the second ciphertext comprising the first encrypted targeted advertisement, wherein communicating the first encrypted targeted advertisement and the first pseudo-identity data to the mediator system comprises communicating the second ciphertext and the first pseudo-identity data to the mediator system, wherein receiving the first encrypted targeted advertisement comprises receiving the second ciphertext, and wherein decrypting the first encrypted targeted advertisement comprises decrypting the second ciphertext to form the first targeted advertisement and the tracking token.

14. The system of claim 13, wherein the at least one publisher system comprises a first publisher system, wherein:

the first user device is configured to communicate the first targeted advertisement and the tracking token to the first publisher system;

the first publisher system is configured to present the first targeted advertisement to the first user;

the first publisher system is configured to communicate the tracking token to the mediator system; and the mediator system is configured to communicate the tracking token to the advertisement network system.

15. A computer program product comprising at least one non-transitory computer-readable medium including one or more instructions that, when executed by at least one processor, cause the at least one processor to:
- receive first persona data associated with a first user from at least one publisher system;
- generalize the first persona data to form first generalized persona data;
- generate a session key;
- encrypt the first generalized persona data and the session key with a first public key of an advertisement network system to form a first ciphertext;
- communicate the first ciphertext and first user identity data to a mediator system, the first user identity data associated with an identity of the first user;
- receive a first encrypted targeted advertisement based on the first generalized persona data from the advertisement network system via the mediator system; and
- decrypt the first encrypted targeted advertisement with the session key to form a first targeted advertisement, wherein the first persona data comprises a first vector, wherein a plurality of users comprises the first user, wherein each respective user of the plurality of users is associated with respective persona data comprising a respective vector, wherein each respective vector comprises a plurality of respective attributes, wherein generalizing the first persona data comprises:

for each respective attribute of the plurality of respective attributes:
- generating a tree comprising a plurality of leaf nodes and a plurality of non-leaf nodes, each leaf node associated with at least one possible value of the respective attribute, each non-leaf node associated with a hierarchical category associated with at least two leaf nodes;
- counting a number of users of the plurality of users having a respective attribute value for the respective attribute associated with the at least one possible value of each leaf node; and
- for each respective non-leaf node, determining a sum of the number of users for all leaf nodes under the respective non-leaf node; and for each respective attribute of the first vector:
- determining whether the number of users of the plurality of users having the respective attribute value for the respective attribute associated with the at least one possible value of a respective leaf node exceeds a threshold; and
- in response to determining that the number of users exceeds the threshold, retaining the respective attribute value for the respective attribute, and, in response to determining that the number of users does not exceed the threshold, replacing the respective attribute value for the respective attribute with the hierarchical category associated with a first non-leaf node for which the sum exceeds the threshold above the respective leaf node.

16. The computer program product of claim 15, wherein counting the number of users comprises:

for each respective attribute of the plurality of respective attributes:
- encrypting the respective attribute value of the respective attribute with a second public key to form an encrypted respective attribute value, wherein the computer program product stores a respective share of a private key associated with the second public key;
- transmitting a message comprising the encrypted respective attribute value to the mediator system;
- receiving a combined message from the mediator system, the combined message associated with a combination of the messages from each respective user based on additive homomorphic encryption;
- decrypting a share of the combined message using the respective share of the private key; and
- transmitting the share of the combined message to the mediator system.

17. The computer program product of claim 15, wherein receiving the first encrypted targeted advertisement comprises receiving a second ciphertext comprising the first encrypted first targeted advertisement and an encrypted tracking token, and
wherein decrypting the first encrypted targeted advertisement comprises decrypting the second ciphertext to form the first targeted advertisement and a tracking token.

* * * * *